United States Patent
Tasaka et al.

(10) Patent No.: US 7,420,638 B2
(45) Date of Patent: Sep. 2, 2008

(54) LIQUID CRYSTAL DISPLAY DEVICE WITH MASK FOR ALIGNMENT

(75) Inventors: Yasutoshi Tasaka, Kawasaki (JP); Hidefumi Yoshida, Kawasaki (JP); Takatoshi Mayama, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 529 days.

(21) Appl. No.: 10/781,180

(22) Filed: Feb. 18, 2004

(65) Prior Publication Data
US 2004/0165133 A1 Aug. 26, 2004

Related U.S. Application Data

(60) Division of application No. 10/139,888, filed on May 6, 2002, now Pat. No. 6,900,868, which is a division of application No. 09/286,917, filed on Apr. 6, 1999, now Pat. No. 6,535,260, which is a continuation-in-part of application No. 09/238,875, filed on Jan. 27, 1999, now abandoned.

(30) Foreign Application Priority Data
Jul. 7, 1998 (JP) .................................. 10-191525

(51) Int. Cl.
*G02F 1/1337* (2006.01)
*G02F 1/141* (2006.01)
*G02F 1/1333* (2006.01)

(52) U.S. Cl. .................. 349/123; 349/110; 349/127; 349/128; 349/129; 349/130; 349/132; 349/133; 349/134; 349/135

(58) Field of Classification Search .................. 349/123, 349/127–130, 132–135
See application file for complete search history.

(56) References Cited

U.S. PATENT DOCUMENTS

| | | | | |
|---|---|---|---|---|
| 5,629,056 A | * | 5/1997 | Koike et al. | 428/1.26 |
| 5,657,102 A | * | 8/1997 | Mizushima et al. | 349/124 |
| 5,853,818 A | * | 12/1998 | Kwon et al. | 427/510 |
| 5,856,431 A | * | 1/1999 | Gibbons et al. | 528/353 |
| 6,040,885 A | * | 3/2000 | Koike et al. | 349/129 |
| 6,300,993 B1 | * | 10/2001 | Kuo et al. | 349/129 |
| 7,016,112 B2 | * | 3/2006 | Choi et al. | 359/487 |
| 7,061,679 B1 | * | 6/2006 | Yoon et al. | 359/485 |

FOREIGN PATENT DOCUMENTS

JP 2-55330 * 2/1990

(Continued)

*Primary Examiner*—David C. Nelms
*Assistant Examiner*—Hoan C Nguyen
(74) *Attorney, Agent, or Firm*—Greer, Burns & Crain, Ltd.

(57) ABSTRACT

A method of fabricating a liquid crystal display device including vertical alignment layers formed on the substrates. The alignment layer having a polymer realizing vertical alignment is formed on the substrate an unpolarized ultraviolet light is then irradiated in the oblique direction at an angle not more than 45 degrees with respect to the surface of the alignment layer. The ultraviolet light has an exposure energy of 30 to 120 mJ/cm2 per percent of the polymer content realizing the vertical alignment of the alignment layer. The liquid crystal can thus align substantially vertically to the surface of the alignment layer, with a pretilt, and such an alignment is realized by the irradiation of the ultraviolet light, without rubbing.

1 Claim, 19 Drawing Sheets

FOREIGN PATENT DOCUMENTS

| | | | |
|---|---|---|---|
| JP | 6-289374 | * | 10/1994 |
| JP | 7209646 | * | 8/1995 |
| JP | 8-15681 | * | 1/1996 |
| JP | 8136927 | * | 5/1996 |
| JP | 8152638 | * | 6/1996 |
| JP | 9005750 | * | 1/1997 |
| JP | 9-197409 | * | 7/1997 |
| JP | 9-211456 | * | 8/1997 |
| JP | 9211468 | * | 8/1997 |
| JP | 9318946 | * | 12/1997 |
| JP | 10104630 | * | 4/1998 |
| JP | 10-123521 | * | 5/1998 |

* cited by examiner

LIQUID CRYSTAL DISPLAY DEVICE WITH MASK FOR ALIGNMENT

CROSS REFERENCE TO RELATED APPLICATION

This is a divisional of application Ser. No. 10/139,888, filed May 6, 2002 now U.S. Pat. No. 6,900,868, which is a divisional of application Ser. No. 09/286,917, filed Apr. 6, 1999, now U.S. Pat. No. 6,535,260, issued Mar. 18, 2003, which is a continuation-in-aprt of application Ser. No. 09/238,875, filed Jan. 27, 1999, now abandoned.

BACKGROUND OF THE INVENTION

1. Field of the Invention

The present invention relates to a liquid crystal display device, and more in particular to alignment treatment technique of alignment layers of a liquid crystal display device.

2. Description of the Related Art

A liquid crystal display device comprises a pair of opposed and spaced substrates, an electrode and an alignment layer formed on one of the substrates, an electrode and an alignment layer formed on the other substrate, and a liquid crystal inserted between the pair of the substrates. The electrode on one of the substrates is a common electrode, and the electrode on the other substrate is formed as pixel electrodes. The pixel electrodes can be arranged with an active matrix. Also, the electrode may be arranged only on one of the substrates (in IPS mode, for example). A black matrix and a color filter are arranged on one of the substrates.

In the conventional TN liquid crystal display device, the alignment layer is rubbed so that the liquid crystal aligns in a predetermined direction. The rubbing is a treatment to rub the alignment layer with a cloth as Rayon, and dust occurs as the cloth of Rayon or the like is brought into the clean room. Also, the rubbing generates static electricity which may destroy the TFT (thin film transistors) of the active matrix. In view of this, JP-A-9-354940 which is an application filed prior to the present application proposes to carry out the alignment treatment by the irradiation of ultraviolet light. The alignment treatment with the irradiation of ultraviolet light can obviate the problem of rubbing. According to that proposal, the unpolarized ultraviolet light is irradiated on the alignment layer having a vertical alignment property, and the alignment layer is aligned so that the alkyl side chain realizing the vertical alignment is only partly destroyed. In the case of a horizontal alignment layer, however, the alignment treatment by irradiation of the ultraviolet light is difficult to realize.

In the case where the alignment layer having the vertical alignment property is treated to realize alignment by irradiating the ultraviolet light, the degree of the alignment depends on the exposure energy of the ultraviolet light to a large measure. An examination shows that it is desirable to irradiate the ultraviolet light of a proper exposure energy. In the case where the exposure energy is smaller than the proper amount, for example, the pretilt angle established by the alignment layer is high (nearer to the normal to the substrate surface). When distributing spacers for maintaining the cell gap of the liquid crystal panel, therefore, the alignment of the portion around the spacers is disturbed. The result is a display fault with an alignment in which a black spot is generated around the spacers at the time of display.

In the case where the exposure energy is larger than the proper amount, in contrast, the pretilt angle established by the alignment layer is low. The excessive exposure energy, however, may make a horizontally-aligned portion and a portion with a filling streak caused at the time of filling liquid crystal, thus leaving a trace. Another problem is that a desired vertical alignment cannot be obtained but a horizontal alignment develops.

Also, the ultraviolet light cannot be irradiated on the surface of the alignment layer at any angle. In the case where the ultraviolet light is irradiated at an angle almost perpendicular to the surface of the alignment layer, for example, it is impossible to selectively leave only a portion of the alkyl side chain of the alignment layer and hence impossible to obtain an alignment in the desired direction.

SUMMARY OF THE INVENTION

The object of the present invention is to provide a method of fabricating a liquid crystal display device by which it is possible to carry out a proper alignment treatment, without rubbing.

According to the present invention, there is provided a method of fabricating a liquid crystal display device comprising a pair of opposed and spaced substrates, an alignment layer formed on one of the substrates, an alignment layer formed on the other substrate, and a liquid crystal inserted between the pair of substrates, the method comprising the steps of forming an alignment layer including a polymer realizing a vertical alignment on each of the substrates, and irradiating the surface of each of the alignment layers with unpolarized ultraviolet light having an exposure energy of 30 to 120 mJ/cm2 per one percent of the polymer content realizing the vertical orientation of the alignment layer in the oblique direction at an angle not more than 45 degrees with respect to the surface of the alignment layers.

The present invention realizes an alignment with a pretilt angle by obliquely irradiating the surface of the vertical alignment layer with the unpolarized ultraviolet light, without rubbing. In the irradiation of the unpolarized ultraviolet light according to the present invention, the unpolarized ultraviolet light is irradiated in the oblique direction at 45 degrees or less with respect to the surface of the alignment layer with an exposure energy of 30 to 120 mJ/cm2 per one percent of polymer content having a side chain realizing the vertical alignment of the alignment layer. In other words, the amount of the irradiation of the ultraviolet light is set in accordance with the actual amount of the side chain realizing the vertical alignment of the alignment layer.

As a result, the alignment layer can provide a proper pretilt angle adapted for vertical alignment of the liquid crystal, without misorder in the alignment around the spacers or without transferring to the horizontal alignment. Under this condition, even if the amount of polymer having side chain contained in the alignment layer for realizing the vertical alignment changes, the proper pretilt angle can be obtained by changing the exposure energy accordingly.

In the above-mentioned method, preferably, the exposure energy of the unpolarized ultraviolet light irradiated on the surface of the alignment layer is in the range of 40 to 90 mJ/cm2.

Also, the exposure energy of the unpolarized ultraviolet light irradiated on the surface of the alignment layer is desirably in the range of 80 to 120 mJ/cm2.

Further, the exposure energy of the ultraviolet light is determined in such a manner that the pretilt angle of the liquid crystal with respect to the surface of the alignment layer is 89.5 degrees or less. Preferably, the pretilt angle of the liquid crystal is in the range of 89.5 to 89 degrees.

Preferably, the ultraviolet light irradiated on the alignment layer contains a component having wavelength of not more than 280 nm.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
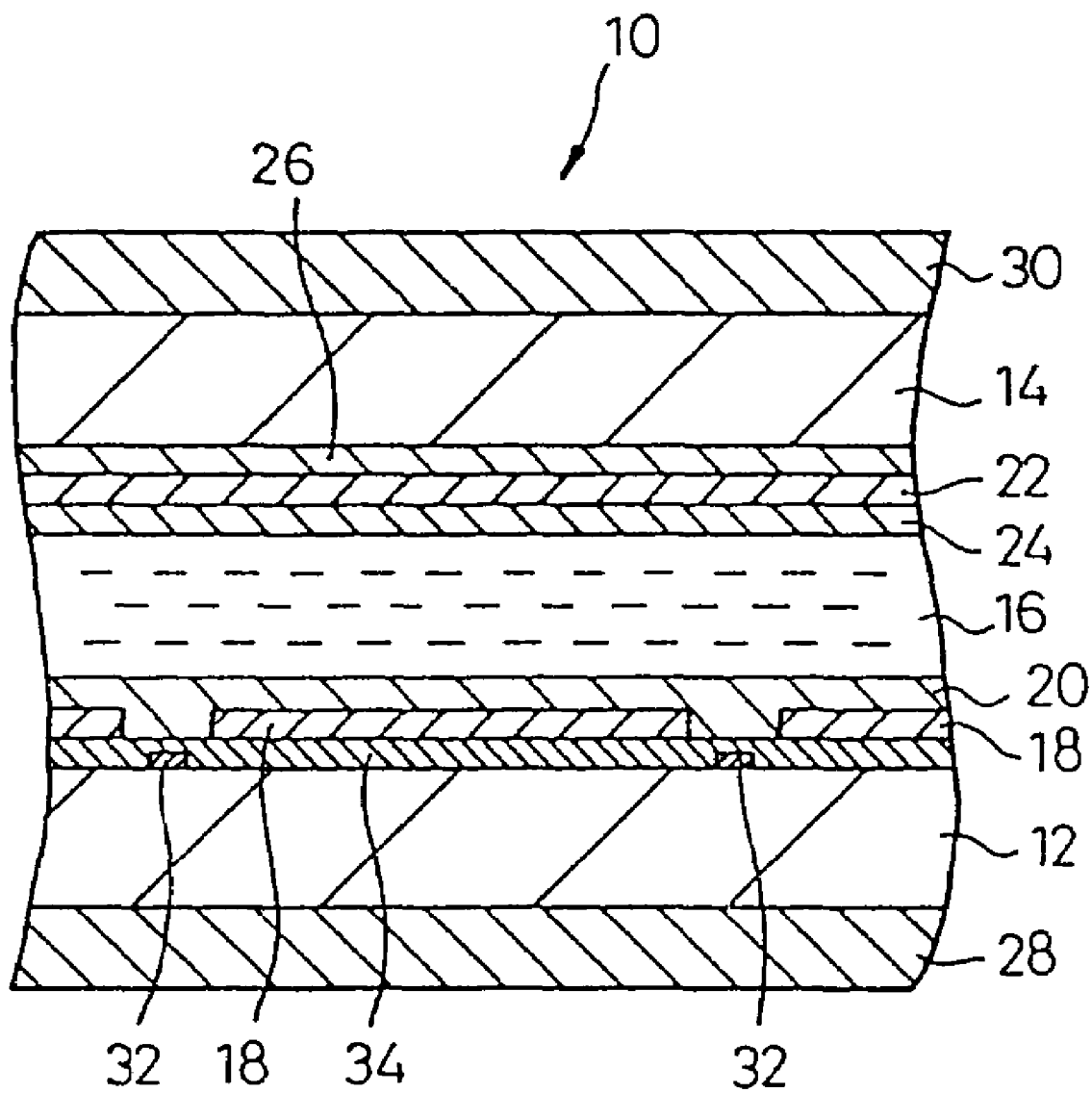
FIG. 1 is a cross-sectional view showing a liquid crystal display device according to the embodiment of the present invention.

FIG. 1 shows a liquid crystal display device obtained by the present invention. The liquid crystal display device 10 comprises a pair of spaced and opposed transparent glass substrates 12, 14, and a liquid crystal layer 16 held between the substrates 12, 14.

Transparent pixel electrodes 18 and a transparent alignment layer 20 are formed on the substrate 12, and a transparent common electrode 22 and a transparent alignment layer 24 are formed on the other substrate 14. The substrate also has a color filter 26. Polarizers 28 and 30 are arranged outside the substrate 12 and the substrate 14. The pixel electrodes 18 of the substrate 12 are formed with an active matrix, and data bus lines. 32 of the active matrix are shown in FIG. 1. Numeral 34 designates an insulating layer. The electrode may be formed only on one of the substrates (such as in IPS mode).

The alignment layers 20 and 24 are ones exhibiting the vertical alignment, and an alignment with a pretilt angle is realized, without rubbing as explained below.

Figure 2:
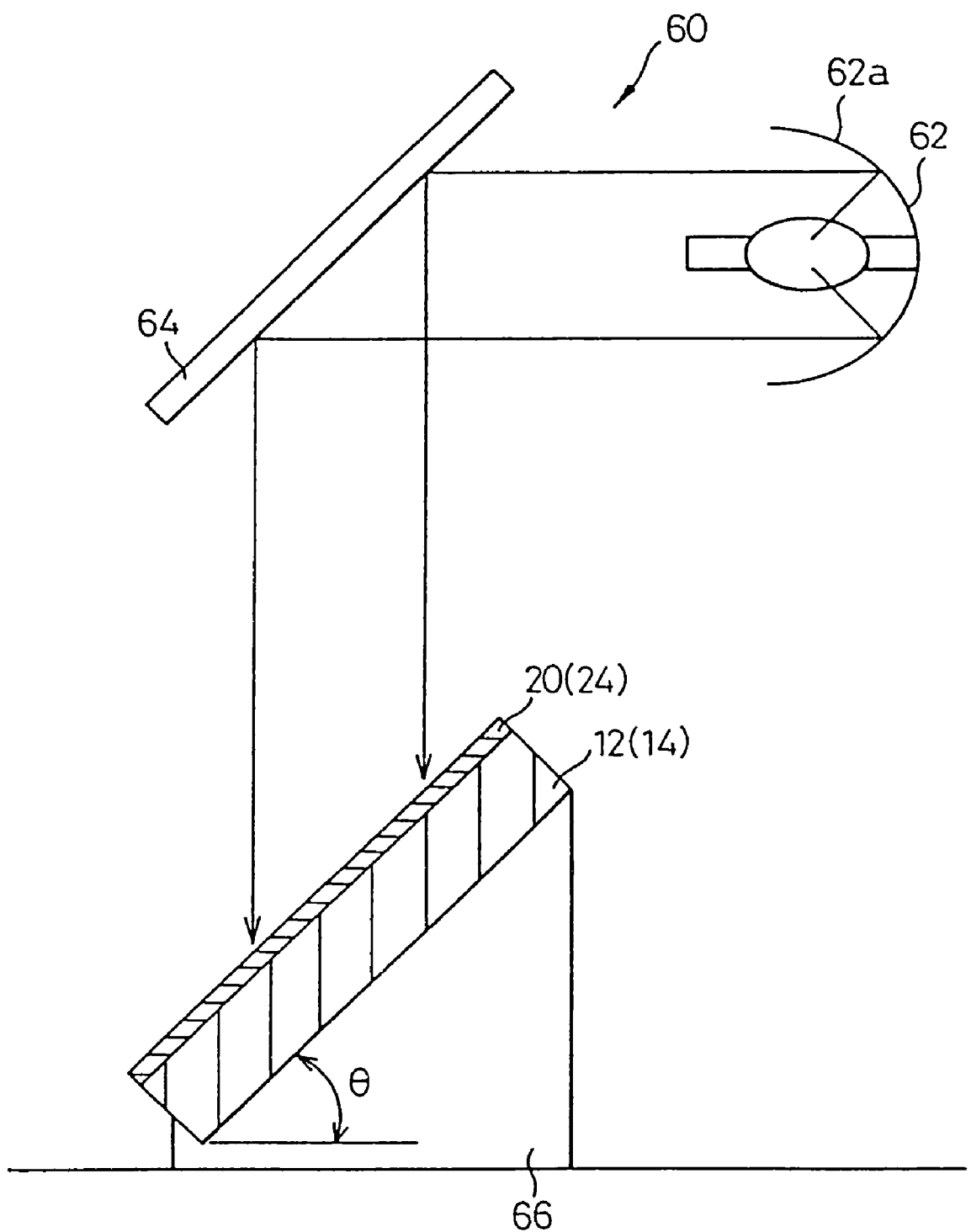
FIG. 2 is a side view showing an ultraviolet light irradiation device.

FIG. 2 shows an alignment treatment device 60 for the alignment layer 20 (24). The alignment treatment device 60 includes a light source 62 for irradiating the unpolarized ultraviolet light, a mirror 64, and a holder 66 for supporting the substrate 12 (14) on which the alignment layer 20 (24) is formed. The holder 66 supports the substrate 12 (14) obliquely with respect to the light axis. Specifically, the parallel ultraviolet light rays from the light source 62 are adapted to enter the alignment layer 20 (24) at an angle of 45 degrees (or less than 45 degrees).

Figure 3:
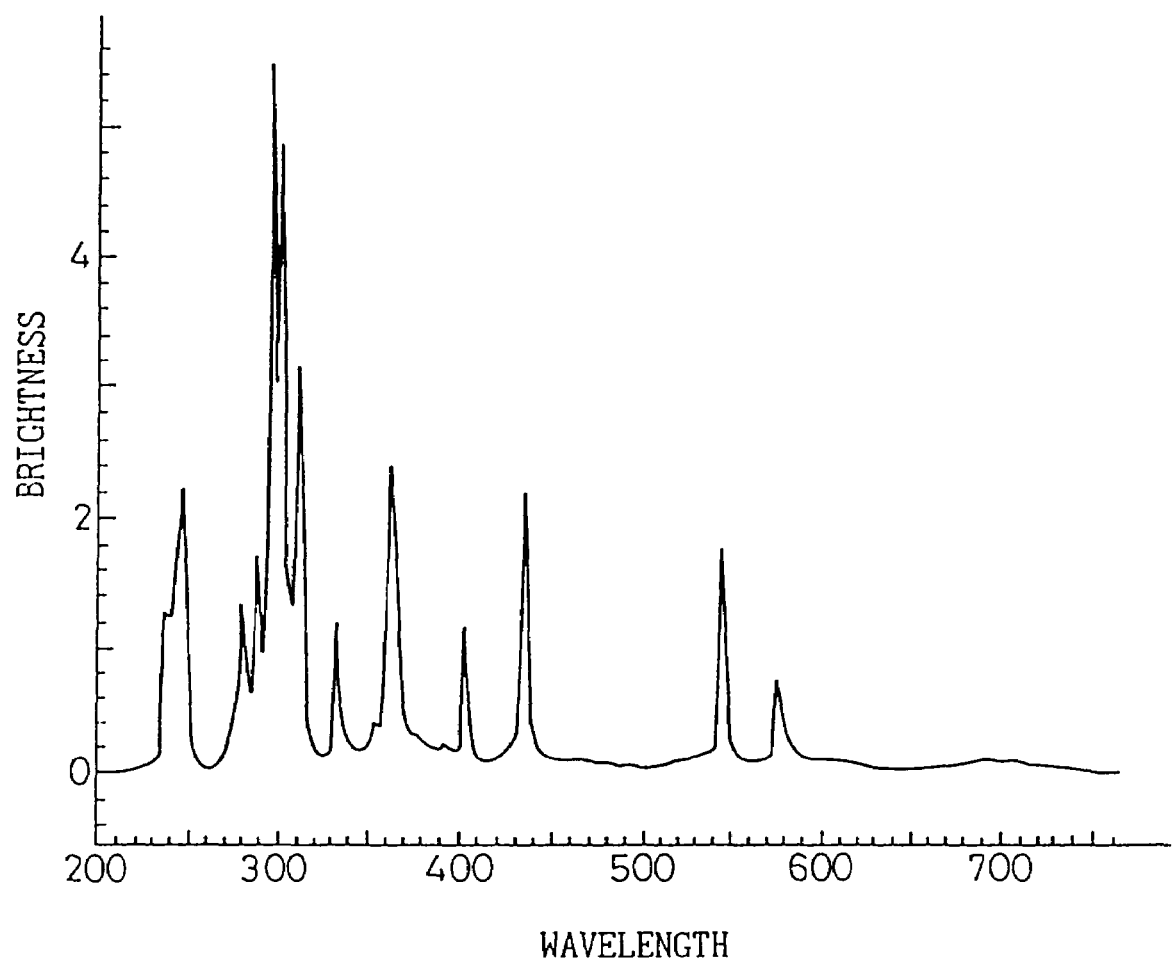
FIG. 3 is a view showing a spectral distribution of the ultraviolet light used with the device of FIG. 2.

The light source 62 including a parabolic reflector 62a produces substantially parallel unpolarized ultraviolet light rays. A preferred spectral distribution of the light source 62 is shown in FIG. 3. This spectral distribution has a peak at the wavelength of about 250 nm. The ultraviolet light irradiated preferably contains a component of not more than 280 nm in wavelength. The layer 20 (24) treated by the alignment treatment device 60 exhibits the vertical orientation, and the alignment with a pretilt angle is realized by irradiating the unpolarized ultraviolet light in the oblique direction.

The alignment layer 20 (24) is one exhibiting the vertical alignment property in the coated and baked state, and contains the polymer shown below.

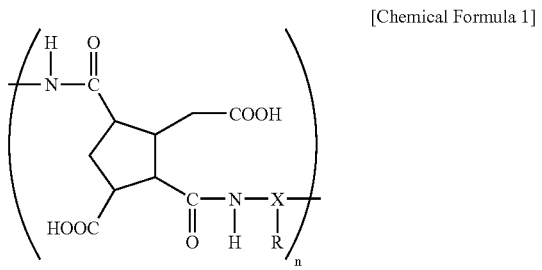

[Chemical Formula 1]

Figure 4:
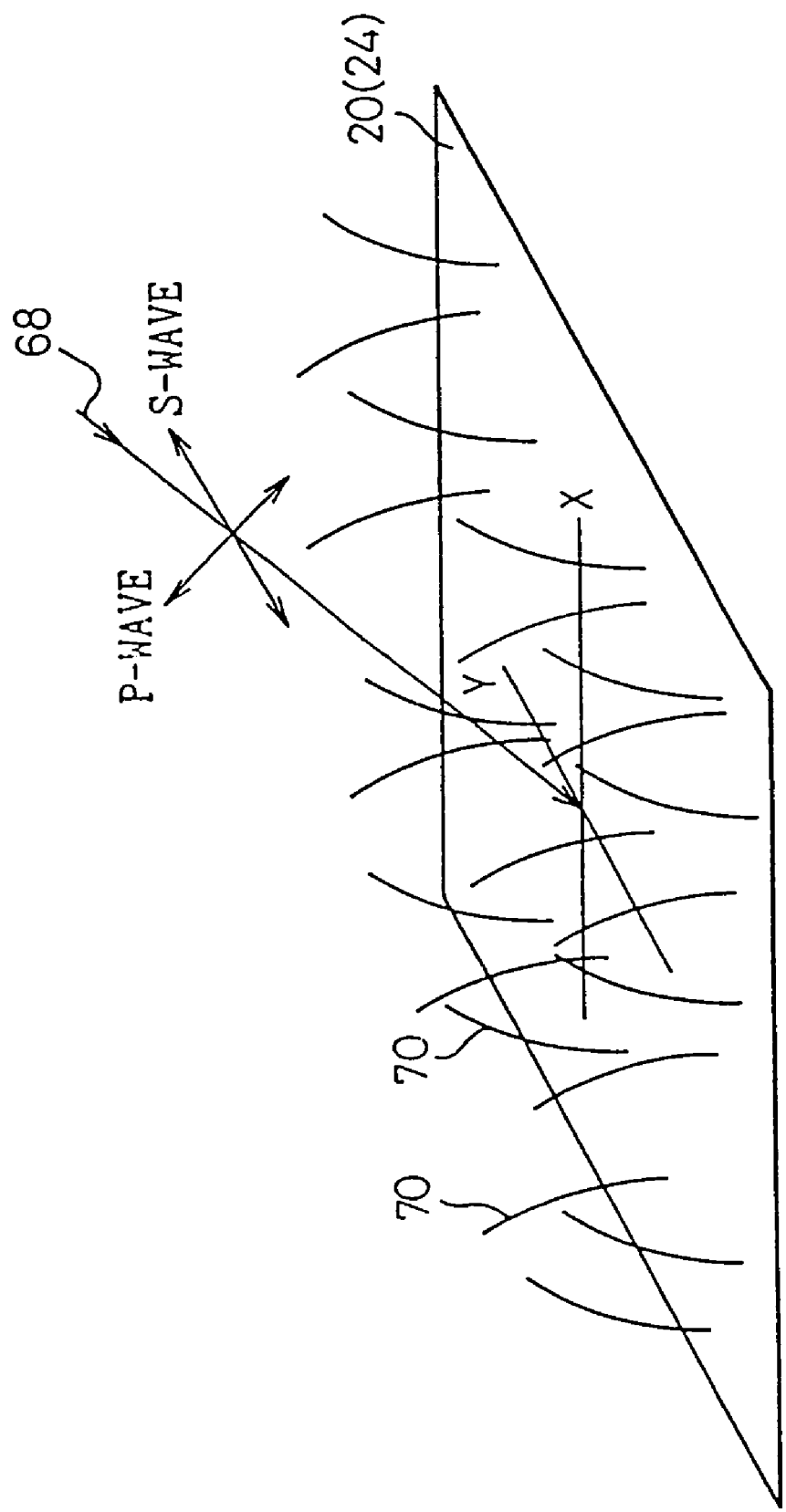
FIG. 4 is a view showing the principle of the alignment treat treatment of the alignment layer.
Figure 5:
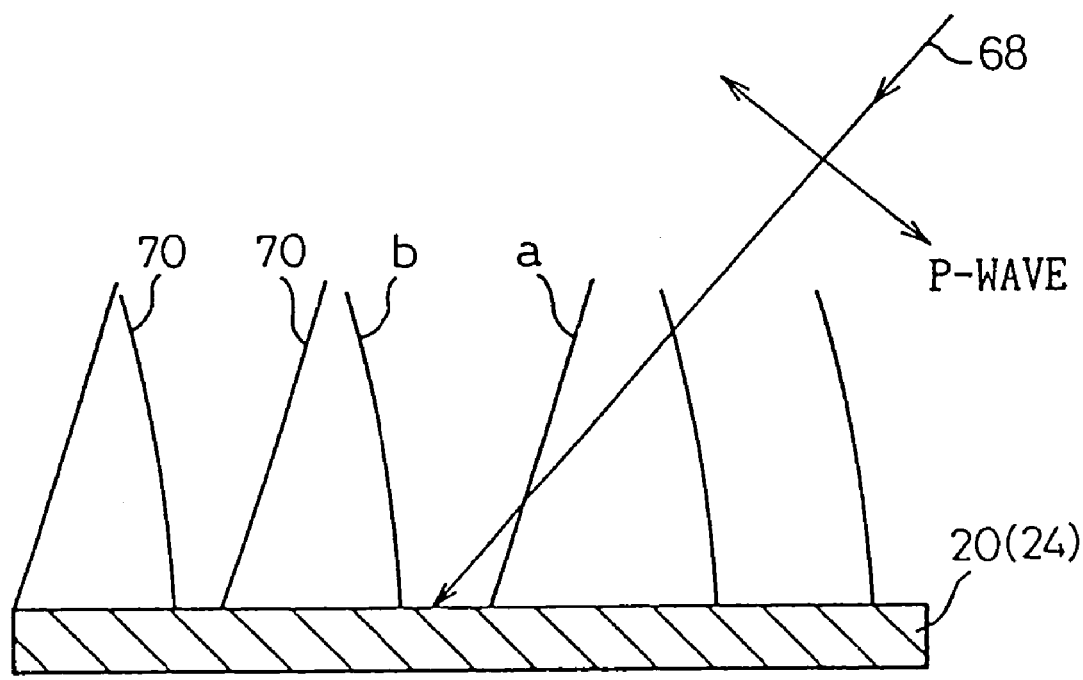
FIG. 5 is a view showing a part of the alignment layer of FIG. 4 in an simplified manner.

FIG. 4 shows the principle of the alignment treatment. FIG. 5 is a view simplified from FIG. 4. The alignment layer 20 (24) shown in the above-mentioned chemical formula 1 contains a polymer having side chains (alkyl group) R realizing the vertical alignment. The alkyl groups R are designated by numeral 70 in FIG. 4. The alkyl groups 70 are considered to project randomly on the surface of the alignment layer 20 (24).

The ultraviolet light 68 is irradiated onto the alignment layer 20 (24) in the azimuth direction X and obliquely, and the pretilt direction (azimuth line) of the liquid crystal is parallel to the azimuth direction of incidence of the ultraviolet light 68. The unpolarized ultraviolet light 68 includes both the P- and S-polarized waves. The S-polarized wave, however, does not contribute to the directivity of alignment. In other words, the S wave does not act at all in the X direction but acts only in the Y direction. The actions thereof in the positive and negative directions along Y axis, however, are of the same magnitude, and therefore the S wave does not alter the directivity of the alignment.

The P wave acts on the portion of the alignment layer 20 (24) containing the alkyl groups 70 in a plane parallel to the direction of incidence of the ultraviolet light 68 and affects the directivity of alignment. FIG. 5 shows a portion of FIG. 4 taken along a plane parallel to the direction of incidence of the ultraviolet light 68, i.e. the direction parallel to the vibration plane of the P wave. In FIG. 5, it can be considered that the alkyl groups 70 are divided into two parts tilted in opposite directions with respect of the direction of vibration of the P wave of the ultraviolet light 68.

The component "a" of then alkyl groups 70 is tilted almost perpendicular to the direction of vibration of the P wave, and the component "b" of the alkyl group 70 is tilted almost horizontal to the direction of vibration of the P wave. Generally, the alkyl group itself is rarely destroyed by ultraviolet light. It is easier to assume that the portion supporting the alkyl group or the portion tilting the alkyl group is destroyed by the ultraviolet light. The portion "a" (corresponding to the component "a") tilting the alkyl group almost perpendicular to the direction of vibration of P wave is destroyed by the ultraviolet light at a different rate than the portion "b" (corresponding to the component "b") tilting the alkyl group almost parallel to the direction of vibration of the P wave.

The portion "b" tilting the alkyl group easily receives energy and is liable to be destroyed by the ultraviolet light energy. Therefore, with the irradiation of the ultraviolet light, the component "b" is reduced and the component "a" leaves undestroyed. When the alignment layer 20 (24) is used with the liquid crystal display device 10, therefore, the liquid crystal molecules are pretilted in accordance with the tilting of the component "a" of the alkyl groups 70.

Figure 6:
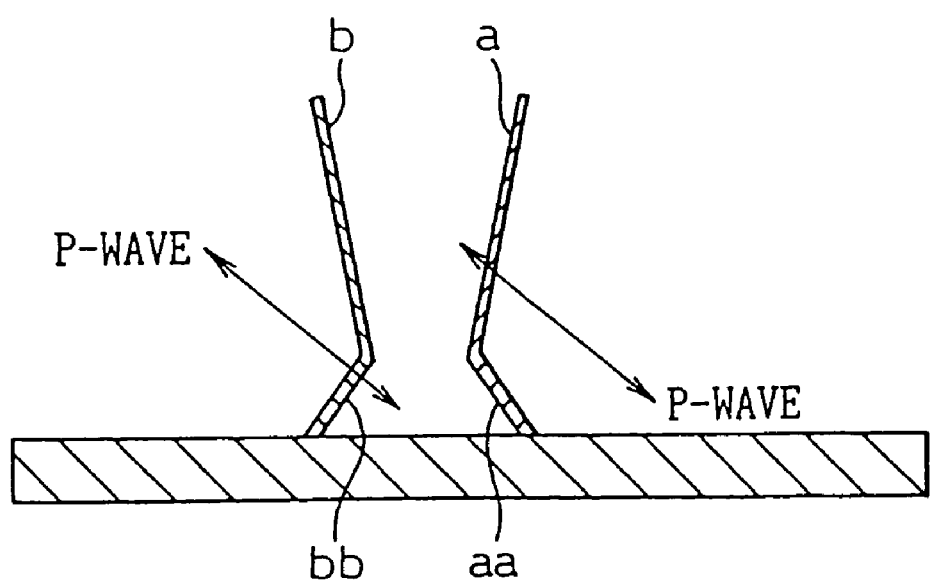
FIG. 6 is a view showing a modification of the alignment layer of FIG. 4.

FIG. 6 shows a modification of FIG. 5. In FIG. 5, the components "a" and "b" of the alkyl groups 70 are assumed to be affected uniformly by the irradiation of the ultraviolet light. On the other hand, FIG. 6 shows the case in which portions "aa" and "bb" of the components "a" and "b" of the alkyl groups 70 are affected especially strongly by the irradiation of the ultraviolet light. These portions "aa" and "bb" are curved in opposite direction to the greater proportion of the components "a" and "b" of the alkyl groups 70.

Consequently, the portion "aa" is easily broken by the energy of the ultraviolet light, while the portion "bb" is not easily broken by the energy of the ultraviolet light. Therefore, the component "b" having the portion "bb" survives, and in the case where the alignment layer 20 (24) is used with the liquid crystal display device 10, the liquid crystal molecules are pretilted in accordance with the tilt of the component "b" of the alkyl group 70 of the alignment layer 20 (24). In the case of FIGS. 5 and 6, the liquid crystal molecules are aligned at a predetermined pretilt angle. With a vertical alignment layer, therefore, the alignment with a pretilt angle can be realized by the oblique irradiation of the unpolarized ultraviolet light, without rubbing.

In FIGS. 5 and 6, however, it is often difficult to categorically determine which component is more easily destroyed, "a" or "b", before the irradiation of the ultraviolet light. Oblique radiation of the ultraviolet light, however destroys one of the components "a" and "b" and leaves the other. As a result, in an application as a liquid crystal display device 10, the liquid crystal molecules are aligned with a pretilt angle, without rubbing.

The feature of the present invention is that the exposure energy of the ultraviolet light irradiated is determined in the range of 30 to 120 mJ/cm2 per one percent (one weight percent) of the polymer content realizing the vertical alignment of each of the alignment layers 20 and 24. The chemical formula (1) described above represents an example of a polymer realizing the vertical alignment of the alignment layers 20 and 24, which contain polymers other than the polymer indicated by the chemical formula (1). Other polymers may contain no component such as the alkyl groups 70 realizing the vertical alignment, and have such a structure that a hydrogen group is substituted for the alkyl group 70, for example. According to this invention, the content of the polymer realizing the vertical alignment relative to all the polymers making up each of the alignment layers 20, 24 is investigated, and the radiation amount of the ultraviolet light is set per 1% of the content.

In this embodiment, a sample containing 25% polymer and a sample containing 65% polymer realizing the vertical alignment of the alignment layer 20 (24) were prepared as the alignment layer 20 (24). First, the material of the vertical alignment layer 20 (24) is applied to the substrate 12 (14) at the rate of 1500 rpm by spin coating. The thickness of the alignment layer 20 (24) involved is about 500 Å. The resulting substrate is baked for one hour at 180° C. Then, the ultraviolet light was radiated onto the alignment layer 20 (24) at an angle of 45 degrees to the surface of the alignment layer 20 (24), using the orientation processing device 60 of FIG. 2. In the process, the DEEP UV irradiation device of Ushio Electric Co. was used as a light source 62. The size of the portion of this light source 62 emitting the ultraviolet light is about 5 mm and substantially parallel ultraviolet light rays were obtained by the reflector 62a.

A plurality of samples were prepared by irradiating the ultraviolet light having several exposure energies within the range of 30 to 120 mJ/cm2 per percent of the polymer content having the alkyl group 70 realizing the vertical alignment of the alignment layer 20 (24), and were assembled into liquid crystal display devices. The first group of samples contained 25% polymer, and the second group of samples contained 65% polymer.

Figure 7:
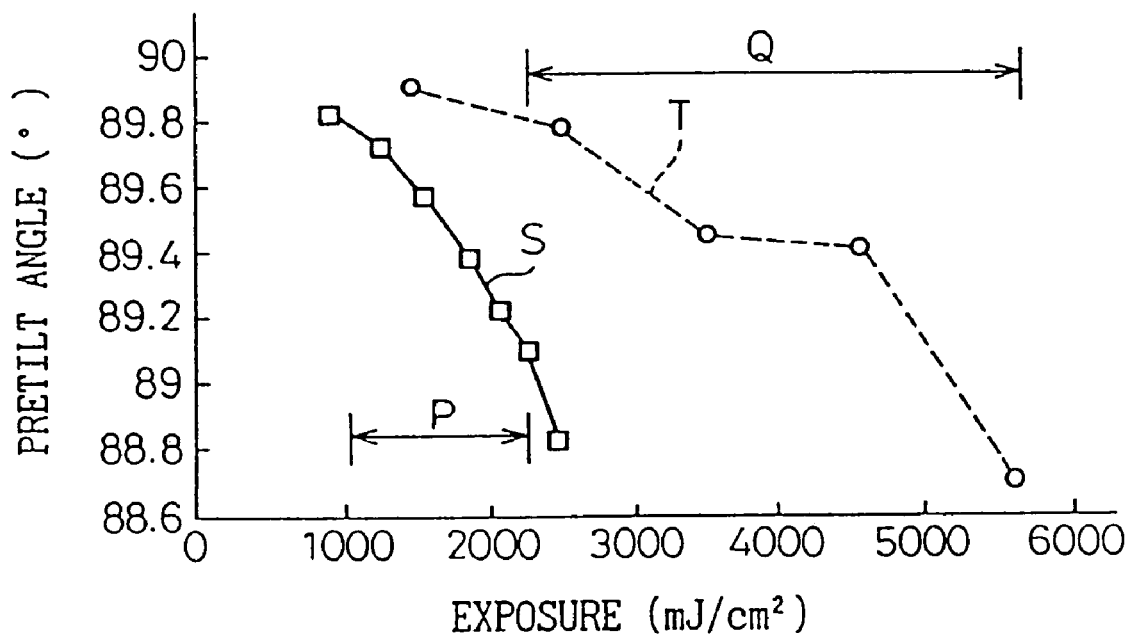
FIG. 7 is a view showing the relationship between the exposure energy of the ultraviolet light and the pretilt angle.

FIG. 7 shows the relationship between the exposure energy of the samples thus prepared and the pretilt angle. The samples of the first group are plotted by a curve S. The samples of the first group are irradiated with the ultraviolet light having an exposure energy in the range of 500 to 2500 mJ/cm2. The samples of the second group are plotted with a curve T. The samples of the second group are irradiated with the ultraviolet light having an exposure energy within the range of 1200 to 6000 mJ/cm2.

An observation of the alignment of the liquid crystal of the above-mentioned samples generally shows that with a low exposure energy (in the area at the left end of FIG. 7), a black spot is caused by the disturbed alignment around the spacers inserted for maintaining the cell gap, and with a high exposure energy (in the area at the right end of FIG. 7), on the other hand, filling streaks at the time of liquid crystal injection appeared. Those free of black spots and filling streaks are considered to have a superior liquid crystal alignment.

As to the samples of the first group, those included in the range P of FIG. 7 were considered to have a superior alignment. The samples of the first group within the range of P were irradiated with the ultraviolet light having the exposure energy within the range of 1000 to 2200 mJ/cm2. The samples of the second group within the range Q of FIG. 7 were considered to have a superior alignment. The samples of the second group within the range of Q were irradiated with the ultraviolet light having the exposure energy in the range of 2400 to 5500 mJ/cm2.

Figure 8:
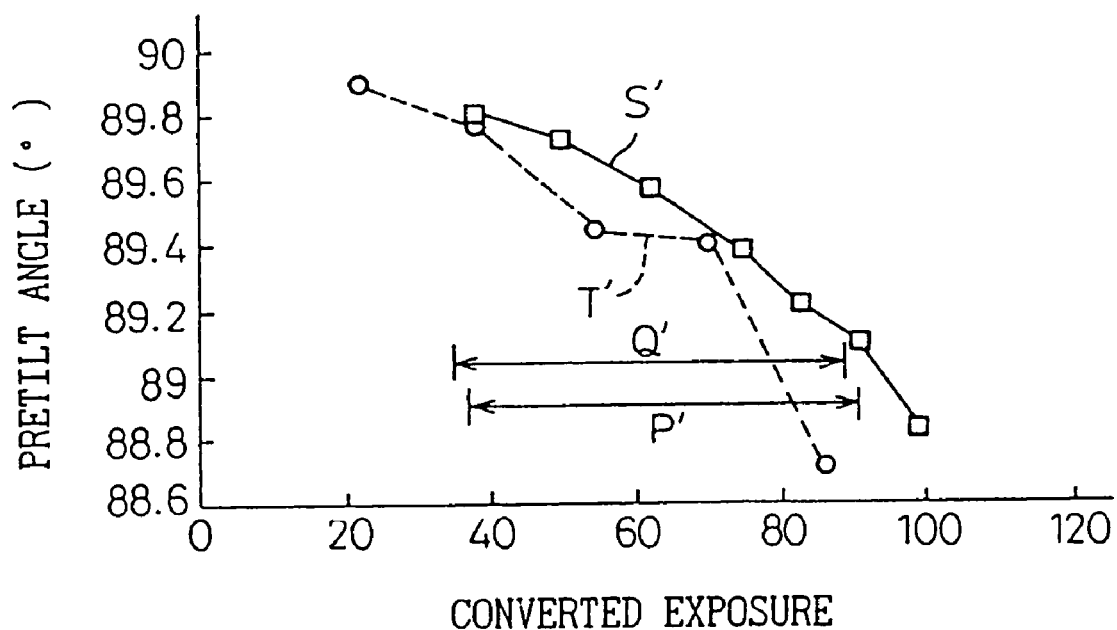
FIG. 8 is a view showing the relationship of FIG. 7 in which the exposure energy is converted to a value per percent of a polymer having an alkyl group realizing the vertical alignment.

FIG. 8 shows the relationship of FIG. 7 in which the exposure energy is converted into a value per percent of a polymer content having an alkyl group realizing the vertical alignment. Specifically, with the first sample, the exposure energy of FIG. 7 is divided by 25, and with the second sample, the exposure energy of FIG. 7 is divided by 65, to determine the exposure energy per percent of polymer content. The curve S representing the relationship of the samples of the first group of FIG. 7 is plotted with a curve S' in FIG. 8. The exposure energy P' which can produce the result of a superior alignment of the liquid crystal was found to be in the range of 40 to 88 mJ/cm2 per percent of a polymer content having an alkyl group realizing the vertical alignment. The curve T showing the relationship of the samples of the second group of FIG. 7 is plotted with the curve T' in FIG. 8. The exposure energy Q' which produces the result of a superior alignment of the liquid crystal was found to be in the range of 37 to 85 mJ/cm2 per percent of the polymer content having an alkyl group realizing the vertical alignment.

This result shows that even when the polymer content in the material of the alignment layer 20 (24) having an alkyl group realizing the vertical alignment changes, a superior alignment of the liquid crystal can be obtained as long as the exposure energy per percent of the polymer content having an alkyl group realizing the vertical alignment is included within a predetermined range. A preferable exposure energy was found to be in the range of 40 to 90 mJ/cm2.

In assembling a liquid crystal display device, the liquid crystal 16 is filled in a gap between a pair of the substrates 12 and 14 and the filling port is sealed with a plug. The above-mentioned embodiment represents the result of a test conducted by applying a voltage between the electrodes 18 and 22 as a liquid crystal display device under this condition. If the liquid crystal panel is heated and annealed after the liquid crystal 16 is filled between the pair of the substrates 12 and 14 and sealed with the plug, then the alignment of the liquid crystal is improved. As a result, a superior alignment of the liquid crystal is obtained in the wider range of the exposure energy than the range described above. The following Table 1 shows the results of such a test.

TABLE 1

| Exposure Energy per 1% | 25% Polymer | | 65% Polymer | |
|---|---|---|---|---|
| | Black Spots | Filling Streaks | Black Spots | Filling Streaks |
| 9.6 | — | — | x | o |
| 15.9 | — | — | xΔ | o |
| 22.3 | Δ | o | Δ | o |
| 38.2 | o | o | o | o |
| 54.1 | o | o | o | oΔ |
| 70.1 | o | o | o | oΔ |
| 86.0 | o | oΔ | o | Δ |
| 101.9 | o | oΔ | o | Δ |
| 117.8 | o | Δ | o | Δ |
| 133.8 | o | x | o | x |

It can be seem from these results that a superior alignment of the liquid crystal can be obtained when the ultraviolet light having an exposure energy of 30 to 120 mJ/cm2 per percent of the polymer content realizing the vertical alignment of the alignment layer is irradiated. Further, when the ultraviolet light having an exposure energy of 80 to 120 mJ/cm2 per percent of the polymer content realizing the vertical orientation of the alignment layer 20 (24) is irradiated, the pretilt angle of the liquid crystal molecules is 89 degrees or less and the function of the vertical alignment layer becomes stable, to thereby prevent an occurrence of domains due to a transverse electric field. With this exposure energy, the pretilt angle was in the range of about 89.6 to 89 degrees.

An occurrence of domains due to a transverse electric field will be explained. The liquid crystal aligned at a pretilt angle almost perpendicular to the alignment layers 20 and 24 is liable to be affected by the transverse electric field from the bus lines or the like of the substrate having TFTs. For reducing the effect of the transverse electric field, it is necessary that the pretilt angle of the alignment layer with respect to the surface of the alignment layer is set to a value as small as possible. A mere reduction in pretilt angle, however, is not sufficient. With the reduction in pretilt angle to some value (to, say, about 85 degrees), the degree of blackness is decreased when a black display is produced with polarizers arranged in the cross nicol, resulting in a lower contrast.

Figure 9:
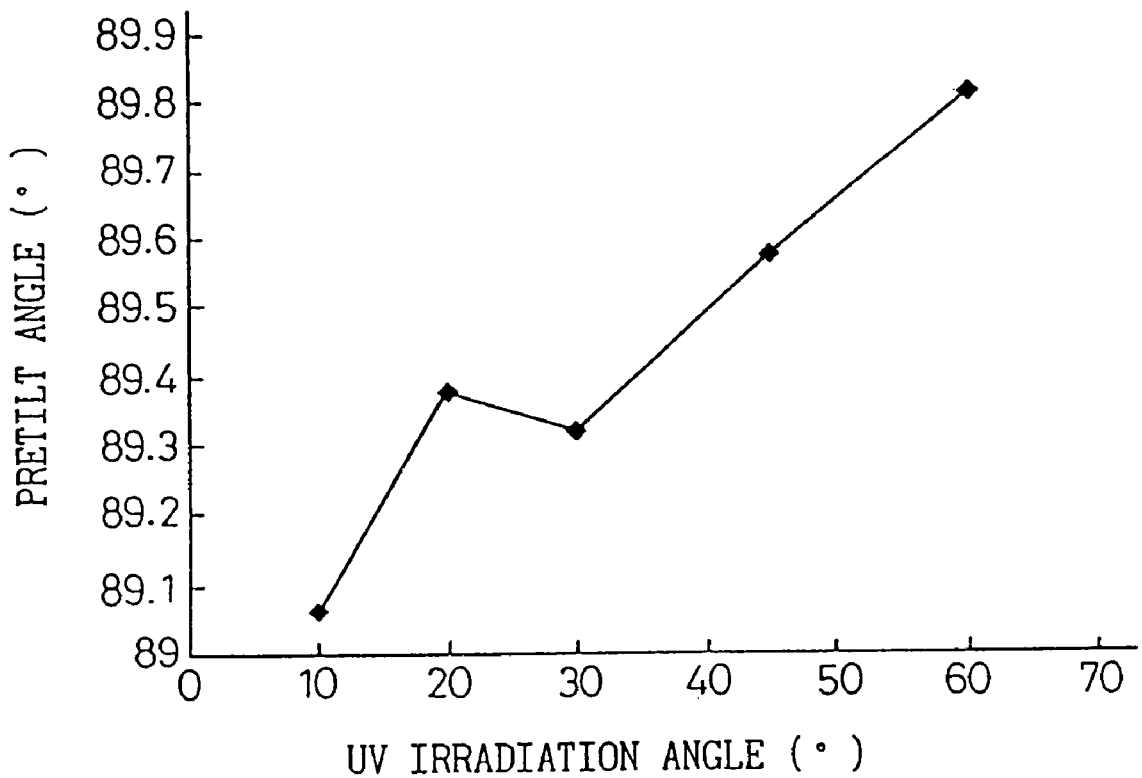
FIG. 9 is a view showing the relationship between the irradiation angle of the ultraviolet light and the pretilt angle.

As shown in FIGS. 7 and 8, the pretilt angle when the unpolarized ultraviolet light is irradiated tends to decrease with the increase in the exposure. Also, as shown in FIG. 9, the smaller the angle of irradiation of the unpolarized ultraviolet light with respect to the surface of the alignment layer, the lower the pretilt angle tends to be. In the experiment, an alignment layer containing 25% polymer having side chains realizing the vertical alignment of the alignment layer was irradiated under many irradiation conditions and applied to the TFT panel, with the result that a superior display with very small domains generated could be obtained under the irradiation condition of ten degrees in irradiation angle and 1800 mJ/cm2 in exposure energy. The pretilt angle in this case was about 89 degrees with respect to the surface of the alignment layer.

To minimize the effect of the transverse electric field, the pretilt angle of not more than 89 degrees is desirable. This requires the amount of the ultraviolet light exposure to the alignment layer of not less than about 80 mJ/cm2 per percent of the polymer containing alkyl groups in the alignment layer. As described above, however, an excessively large amount of ultraviolet light exposure poses the problem of filling streaks being generated at the time of filling the liquid crystal and a trace thereof remaining. In FIG. 8, the filling streaks occur at 90 mJ/cm2 or more. As described above, however, by conducting post-filling annealing, an irradiation condition under which the pretilt angle of not more than 89 degrees is obtained, without filling streaks, is in the range of about 80 to 120 mJ/cm2.

The spectral distribution shown in FIG. 3 includes a wavelength component of about 250 nm, which component was effective. In this way, a lamp of a short arc type is used as a light source, so that ultraviolet light rays of about 250 nm are mainly used, and the parallelism of the ultraviolet light rays is not more than ±10 degrees, or preferably, not more than ±3 degrees, using the reflector. Two tests were conducted, one using the source light having the spectral distribution shown in FIG. 3, and the other using the ultraviolet light from the same light source with a wavelength component of not less than 300 nm cut off from the source light. Comparison of the test results shows a similar pretilt realization. This indicates that the irradiation of the ultraviolet light of not more than 280 nm is effective to develop a pretilt in the vertical alignment layer 20 (24).

FIG. 9 shows the relationship between the ultraviolet light irradiation angle and the pretilt angle. The alignment layers comprising the above-described samples (25%) of the first group and samples (65%) of the second group were irradiated with the ultraviolet light having an exposure energy of 1800 mJ/cm2 to test the change to the pretilt angle for different irradiation angles. The irradiation of the ultraviolet light at an angle of not more than 45 degrees with respect to the surface of the alignment layer is known to produce a satisfactory alignment. As for the pretilt angle, the lower the irradiation angle to the alignment layer surface, the lower the pretilt angle. In this case, the pretilt angle at the irradiation angle at which the alignment of the liquid crystal is satisfactory is not more than 89.5 degrees. The foregoing fact suggests that the pretilt angle of not more than 89.5 degrees is desirable to eliminate the adverse effect of the spacers on the alignment.

In this embodiment, the pretilt realizing property could be given to the vertical alignment layer 20 (24), using the unpolarized ultraviolet light. Only the P wave of the unpolarized ultraviolet light is actually effective, but the fact that the unpolarized ultraviolet light can be used has a greater advantage. Conventionally, a proposal to provide a pretilt realizing property to a horizontal alignment layer was proposed by irradiating the polarized ultraviolet light onto the horizontal alignment layer. In that case, it is not possible to provide a pretilt realizing property, using the unpolarized ultraviolet light. For this reason, a polarizer was required to produce a polarized ultraviolet light, but such a polarizer is limited to the Glan-Taylor type. A polarizer of the Glan-Taylor type, however, is produced by cutting a natural calcite and is not suitable for practical applications. The alignment treatment using the unpolarized ultraviolet light, therefore, is very preferable and eliminates the need of using the polarizer for irradiating the ultraviolet light.

Figure 10:
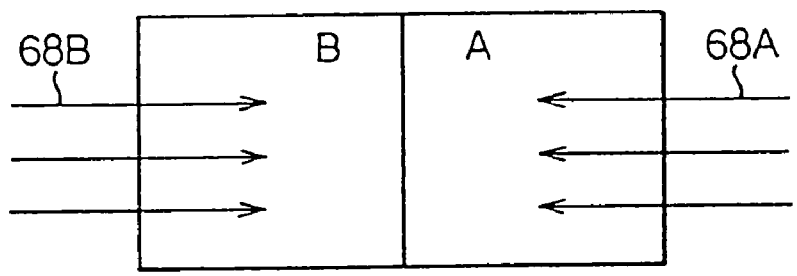
FIG. 10 is a view showing the alignment treatment in which a single pixel has two domains.
Figure 11:
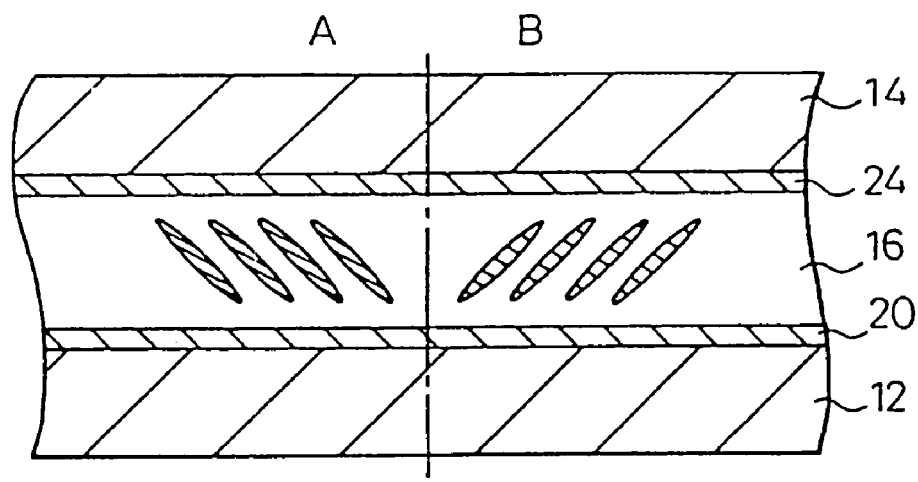
FIG. 11 is a view showing the alignment division achieved by the alignment treatment of FIG. 10.

In this embodiment, the unpolarized ultraviolet light is uniformly irradiated over the entire surface of the vertical alignment layer 20 (24). For effecting alignment division in which domains A and B in two different alignment directions exist in a single pixel, therefore, the ultraviolet rays 68A and 68B are irradiated in the opposite directions for each of the divided domains A and B, as shown in FIG. 10. By doing so, two domains A and B in which the intermediately located liquid crystal molecules are tilted in the opposite directions are obtained, as shown in FIG. 11. In this case, there is no difference in the pretilt angle of liquid crystal molecules between the two domains A and B. The orientation splitting improves the viewing angle characteristic.

Figure 12:
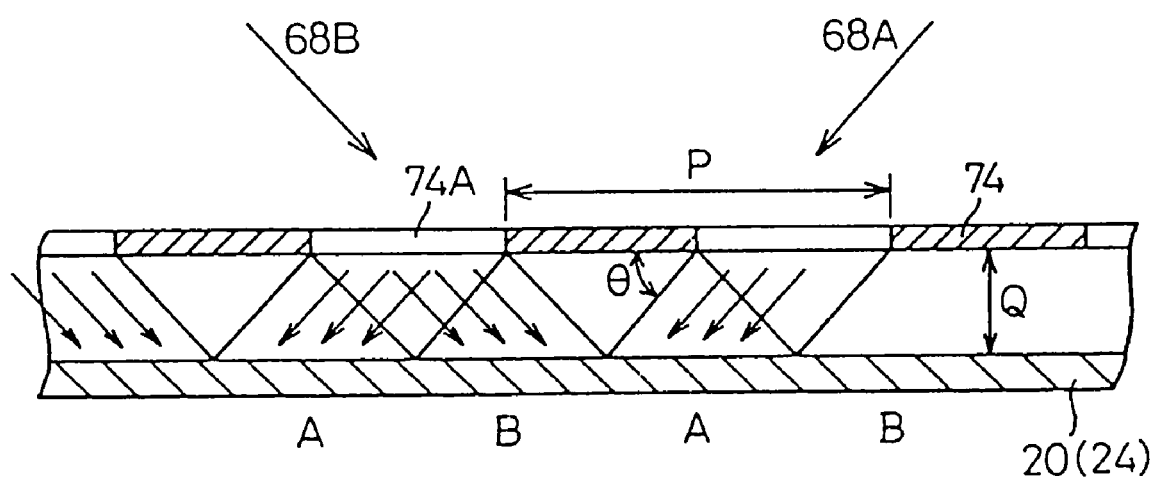
FIG. 12 is a view showing a mask for performing the alignment treatment of FIGS. 10 and 11.

FIG. 12 shows an example in which the ultraviolet rays 68A and 68B are irradiated at the same time in opposite directions for each of the domains A and B. In this case, a mask 74 having openings 74A is used. The ultraviolet rays 68A and 68B enter a single opening 74A in the opposite directions, and the condition under which the ultraviolet rays 68A, 68B in opposite directions are assigned exactly to two domains A and B is as follows. Specifically, there is a relationships $Q=(P/4)\sin\theta$, where the pitch of the openings 74A of the mask 74 (pitch of one pixel) is P, the distance between the mask 74 and the alignment layer 20 (24) is $\theta$, and the incident angle of the ultraviolet rays 68A and 68B is $\theta$.

Figure 13:
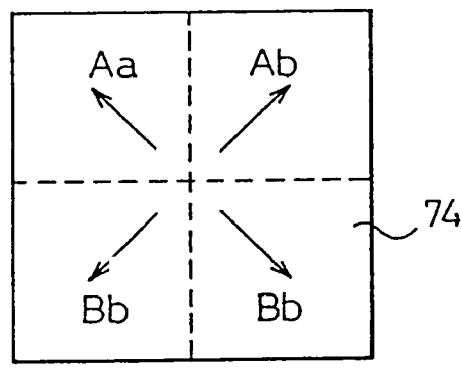
FIG. 13 is a view showing a modification of FIG. 10.

As shown in FIG. 13, by applying this principle, four different domains Aa, Ab, Ba and Bb can also be formed in one pixel by irradiating the ultraviolet light rays in four directions at the same time. In this case, one pixel is divided into a plurality of domains Aa, Ab, Ba and Bb, and the alignment directions of the liquid crystal of the domain domains Aa, Ab, Ba, Bb are directed radially from the pixel center, as shown by the arrows. In FIG. 13, the alignment directions of the liquid crystal are directed outward from the center, as shown by the arrows. It is also possible to arrange so that the alignment directions of the liquid crystal are directed inward toward the center of the pixel. In this way, the provision of the four domains Aa, Ab, Ba and Bb in one pixel can improve the viewing angle characteristic.

Figure 14:
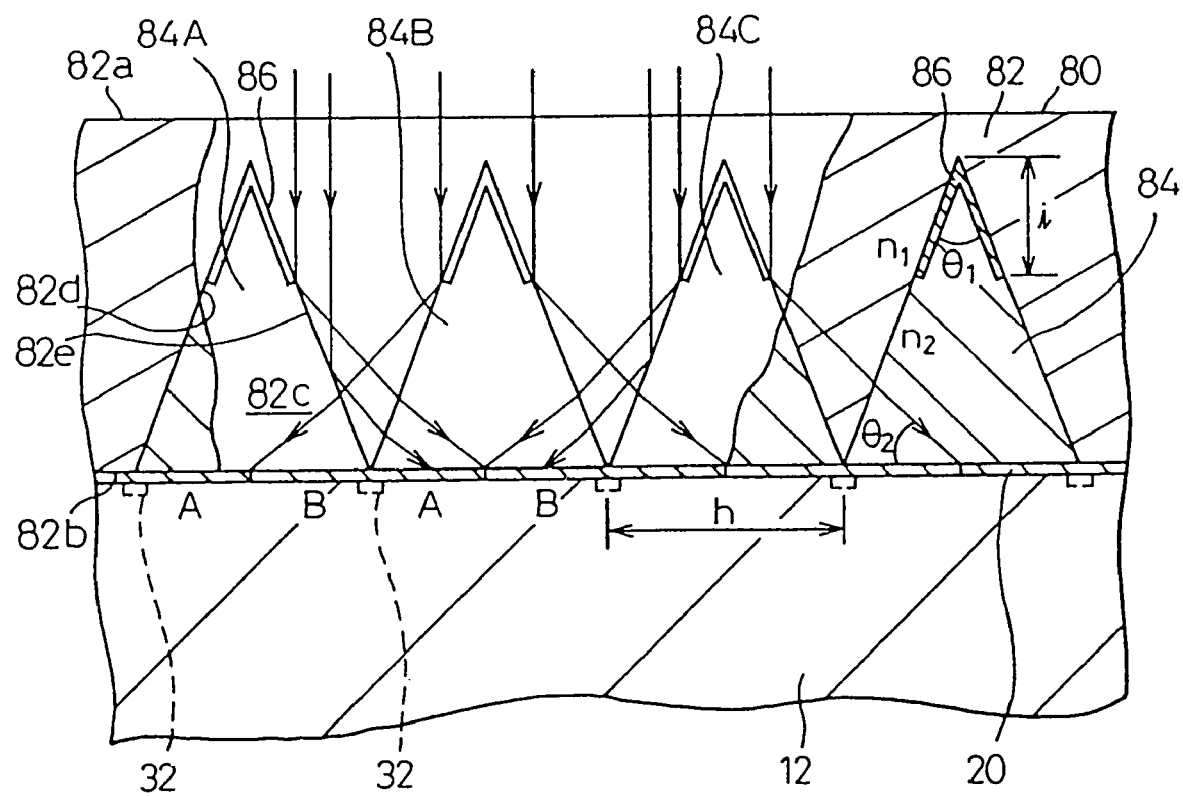
FIG. 14 is a view showing the process of alignment treatment of the alignment layer according to another embodiment of the present invention.

FIG. 14 shows the process of alignment treatment of the alignment layer according to another embodiment of the present invention. This embodiment, like the embodiment shown in FIG. 1, is applicable to a liquid crystal display device comprising a pair of substrates 12 and 14, an electrode 18 and an alignment layer 20 formed on one of the substrates, an electrode 22 and an alignment layer 24 formed on the other substrate, and a liquid crystal 16 inserted between the pair of the substrates 12 and 14. The alignment layers 20 and 24 are treated by irradiating the ultraviolet light thereto in the oblique direction as in the preceding embodiments. The alignment layers 20 and 24, however, include two domains A and B in one pixel, as shown in FIG. 11.

In this embodiment, in fabricating a liquid crystal display device, a mask 80 is used when the ultraviolet light is irradiated in the oblique direction after forming the alignment layer 20 (24) on the substrate 12 (14). The mask 80 includes a body portion 82 and light path changing portions 84 embedded in the body portion 82 and having a different refractive index from that of the body portion 82. Each of the light path changing portions 84 has a saw-toothed shape having an equilateral triangular cross-section with the length of the bottom side "h" corresponding to the length of the pixel pitch. Further, a shielding film 86 is formed at the portion of the light path changing portion located on the apex of the equilateral triangle.

Figure 15:
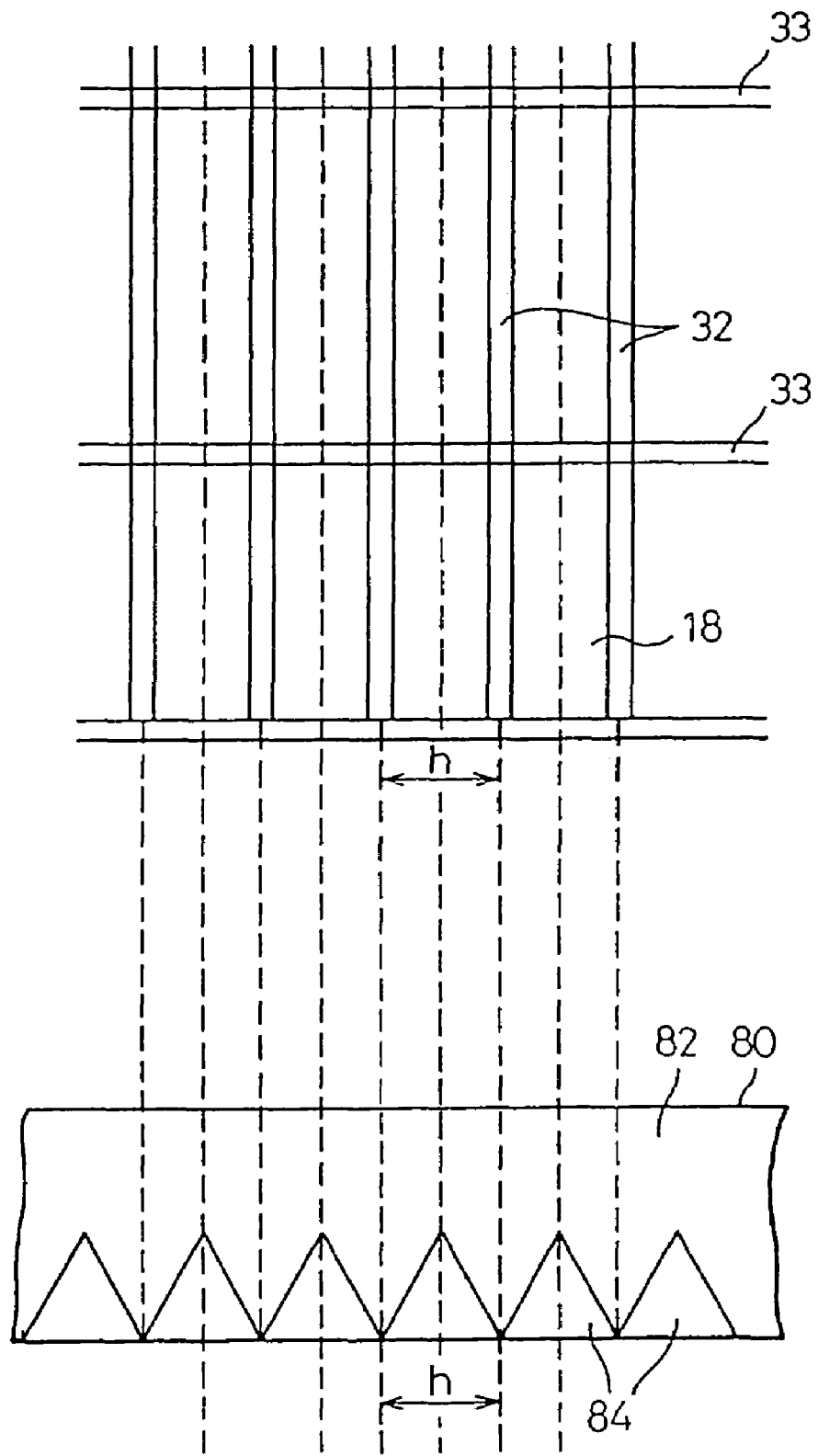
FIG. 15 is a view showing the relationship between the mask used in FIG. 14 and the pixel.

FIG. 15 shows the relationship between the mask 80 used in FIG. 14 and pixels. One of the first and second substrates 12 and 14 is a TFT substrate. The TFT substrate includes pixel electrodes 18, drain bus lines 32 and gate bus lines 33. The TFTs (riot shown) are arranged at each crossing between the drain bus lines 32 and the gate bus lines 33. The pixel pitch "h" is the distance between the centers of two adjacent drain bus lines 32, and the length of the bottom side h of the light path changing portion 84 corresponds to the pixel pitch "h".

The pixel pitch "h" can also be the distance between-the centers of two adjacent gate bus lines 33.

In FIG. 14, the mask 80 is arranged in such a position that the bottoms of the equilateral triangles of the light path changing portions 84 rest on the alignment layer 20 (24), and the parallel ultraviolet rays are made includent to the mask 80 in the direction perpendicular to the alignment layer 20, as shown by arrows. The incident ultraviolet rays are reflected by the slopes of the equilateral triangles of the light path changing portions 84, directed toward the slopes of the equilateral triangles of the adjacent light path changing portions 84, and enter the light path changing portions 84 via these slopes.

Considering the three light path changing portions 84A, 84B and 84C, the ultraviolet light reflected by the right slope of the left light path changing portion 84A is directed toward the left slope of the central light path changing portion 84B, and enters the light path changing portion 84B via that slope. The ultraviolet light reflected by the left slope of the right light path changing portion 84C, on the other hand, is directed toward the right slope of the central light path changing portion 84B and, enters the light path changing portion 84B via that slope. The ultraviolet lights that have entered the central light path changing portion 84B from the left slope and the right slope thereof are made incident to the surface of the alignment layer 20 (24) obliquely. Therefore, as in the above-mentioned embodiments, the oblique irradiation of the ultraviolet light to the alignment layer 20 (24) makes it possible to effect the alignment treatment of the alignment layer 20 (24).

The shape of the equilateral triangle of the light path changing portion 84 and the shielding film 86 are formed in such a manner that the ultraviolet light reflected by the right slope of the left light path changing portion 84A and entering the left slope of the central light path changing portion 84B enters the half area of one pixel of the alignment layer 20 (24) through the central light path changing portion 84B. In a similar fashion, the ultraviolet light reflected by the left slope of the right light path changing portion 84C and entering the right slope of the central light path changing portion 84B enters the remaining half area of one pixel of the alignment layer 20 (24) through the same light path changing portion 84B. Consequently, the alignment division is effected, as explained with reference to FIGS. 10 and 11.

Here, the following equation (1) is satisfied in the case where $\theta 1 \leq 60$, $$n1 \cos(3\theta 1/2) = n2 \sin(\theta 2 - \theta 1/2) \quad (1)$$

and the following equation (2) is satisfied in the case where $\theta 1 > 60$, $$n1 \cos(3\theta 1/2) = n2 \sin(\theta 1/2 - \theta 2) \quad (2)$$

where n1 is the refractive index of the body portion 82, n2 is the refractive index of the light path changing portion 84, $\theta 1$ is the apex angle (apex angle of the equilateral triangle) of the saw-toothed section, and $\theta 2$ is the incident angle of the ultraviolet light irradiated on the alignment layer 20 through the light path changing portion 84.

Further, for the alignment division is to be established, the shielding film 86 has a height "i" represented in the following equation (3), from the apex portion of the equilateral triangle when "h" is the pitch of the light path changing portion 84 of a saw-toothed section of the equilateral triangle.

$$i = \frac{h}{2} \times \frac{\left(\tan\theta_1 - \tan\frac{\theta_1}{2} - 2\tan^2\frac{\theta_1}{2}\tan\theta_2\right)}{\left(\tan\theta_1 \tan\frac{\theta_1}{2} - \tan^2\frac{\theta_1}{2} + \tan\theta_1 \tan^2\frac{\theta_1}{2}\tan\theta_2 - \tan^3\frac{\theta_1}{2}\tan\theta_2\right)} \quad (3)$$

Figure 16:
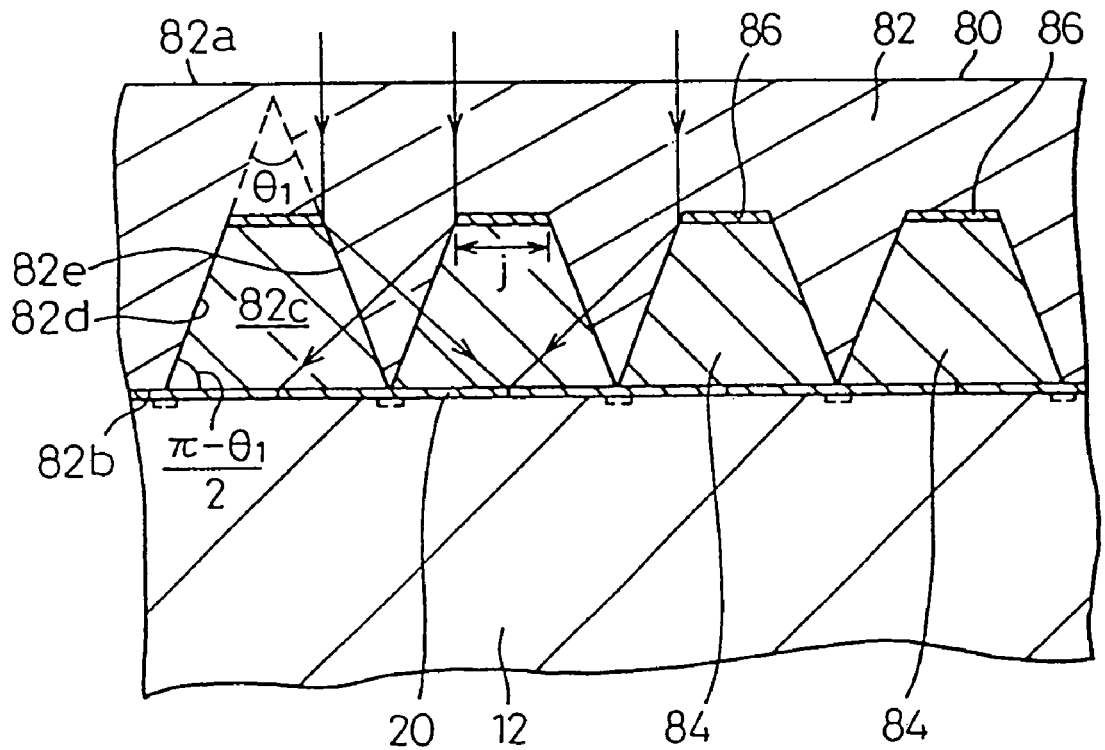
FIG. 16 is a view showing a modification of the mask of FIG. 14.

FIG. 16 shows a modification of the mask 80. The mask 80 includes a body portion 82 and light path changing portions 84 embedded in the body portion 82 and having a refractive index different from that of the body portion. In this case, the light path changing portion 84 has a saw-toothed shape having a trapezoidal cross-section and a shielding film 86 is formed on the upper side of the trapezoid. The trapezoid is regarded as an equilateral triangle of FIG. 14 with the top thereof cut off. Thus, the slopes of the trapezoid and the shielding film 86 have the same function as the corresponding portions in the embodiment of FIG. 14.

In this case, the two slopes of the trapezoid are extended, and let $\theta 1$ is the apex angle of the saw-toothed section formed by the extended lines. Equations (1) and (2) apply also to the trapezoid. The apex angle $\theta 1$ can be determined by utilizing the fact that the angle between the slopes and the bottom side of the trapezoid is given as $(\pi - \theta 1)/2$ instead of forming the extended lines.

In the case of the trapezoid, the length "j" of the shielding film 86 represents the size of the upper side of the trapezoid and is expressed by the equation (4) below.

$$j = h \frac{\left(\tan\theta_1 - \tan\frac{\theta_1}{2} - 2\tan^2\frac{\theta_1}{2}\tan\theta_2\right)}{\left(\tan\theta_1 - \tan\frac{\theta_1}{2} + \tan\theta_1 \tan\frac{\theta_1}{2}\tan\theta_2 - \tan^2\frac{\theta_1}{2}\tan\theta_2\right)} \quad (4)$$

Further, in the case of the equilateral triangle as well as in the case of the trapezoid, the following relationship exists between the refractive index n1 of the body portion 82, the refractive index n2 of the light path changing portion 84 and the apex angle $\theta 1$ of the saw-toothed section.

$$\cos\theta 1 \geq n2/n1 \quad (5)$$

Now, a specific example will be explained. The material of the body portion 82 of the mask 80 is glass having a refractive index n1 of 1.5, and that of the light path changing portions 84 is air having a refractive index n2 of 1.0. In other words, the body portion 82 of the mask 80 has recesses corresponding to the light path changing portions 84 and air is contained in the recesses.

The pixel pitch "h" is 100 μm, for example, and the light path changing portions 84 are similarly continuously arranged at pitches of 100 μm. When the alignment layer 20 (24) is irradiated with the ultraviolet light, as shown in FIG. 15, the apex of the equilateral triangle of the light path changing portion 84 of the mask 80 is set in registration with the center of the pixel electrode 18 (or the bottom angle of the equilateral triangle is set in registration with the center of the bus lines 32), so that the mask 80 is attached closely to the substrate 12 (14) formed with the alignment layer 20 (24).

In the case where parallel ultraviolet rays are irradiated through the mask 80, the angle between the ultraviolet light first entering the slope of the light path changing portion 84 of the mask 80 and the slope of the light path changing portion 84 is given as $\theta 1/2$.

Assuming that the apex angle θ1 of the equilateral triangle is 50 degrees, the radiation of parallel ultraviolet rays from the upper surface of the mask 80 in the direction perpendicular to the upper surface of the mask 80 causes the ultraviolet rays to enter the slope of the light path changing portion 84 at an angle of 65 degrees (25 degrees to the slope). The ultraviolet light that has entered at this angle exceeds the critical incident angle of 41.8 degrees (cos θ=0.666) in the boundary surface and, therefore, is totally reflected. The light thus reflected enters the slope of the adjacent light path changing portion 84 at an incident angle of 15 degrees and after refraction, enters the light path changing portion 84. The ultraviolet light that has passed through the light path changing portion 84 enters the surface of the alignment layer 20 (24) at an angle of about 47.8 degrees. For each of the ultraviolet rays entering the two slopes of the light path changing portion 84 to radiate just one half of the surface of alignment layer 20 (24), the height i of the shielding film 86 is required to be 23.9 μm. The shielding film 86 is formed of carbon black or the like.

As described above, the reflection and the refraction occur in the boundary surface between the body portion 82 and the light path changing portion 84, and the alignment layer is irradiated at an angle of about 47.8 degrees. As a result, one half of the alignment layer is irradiated at an angle of about 47.8 degrees and the remaining half thereof is irradiated at an angle of about 47.8 degrees from the opposite direction in one pixel. Consequently, the alignment layer 20 (24) is irradiated in the divided fashion at an angle of about 47.8 degrees in the opposite directions with a single irradiation of the ultraviolet light. The substrates 12, 14 having the alignment layers 20, 24 formed in this way are attached to each other and the liquid crystal is filled to form a panel. An electrode may be arranged on both substrates or only one of them.

Figure 17:
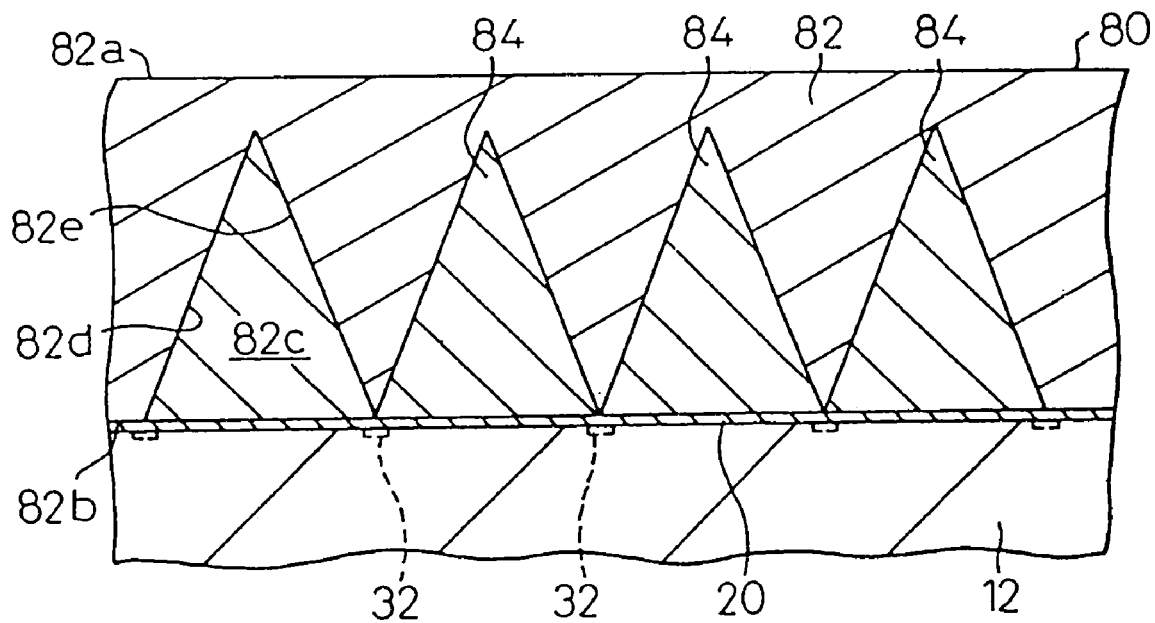
FIG. 17 is a view showing a modification of the mask of FIG. 14.

Assuming that the apex angle θ1 of the equilateral triangle is 44 degrees, the incident angle θ2 to the alignment layer 20 (24) is 59.8 degrees. In such a case, the height requirement i=0 of the shielding film 86 is met and therefore the shielding film 86 is not required. FIG. 17 shows this state.

The arrangement described above with reference to FIGS. 14 to 17 can be expressed as follows. The body portion 82 of the mask 80 has a first flat surface 82a, a second surface 82b on the opposite side from the first surface 82a, and a plurality of cavities 82c provided in the second surface 82b. Each cavity 82c has first and second oblique surfaces 82d and 82e arranged to diverge in the direction from the first surface 82a toward the second surface 82b.

Each cavity 82c has a central line between first and second oblique surfaces 82d and 82e, and the light path changing portions 84 are formed by the cavities 82c and a material contained in the cavities 82c. Therefore, the ultraviolet light, which is made incident to the body portion 82 from the first surface 82a and passing through the first oblique surface 82d, is applied to the alignment layer 20 in a first oblique direction, and the ultraviolet light, which is made incident to the body portion 82 from the first surface 82a and passing through the second oblique surface 82e, is applied to the alignment layer 20 in a second oblique direction opposite to the first oblique direction.

Figure 18:
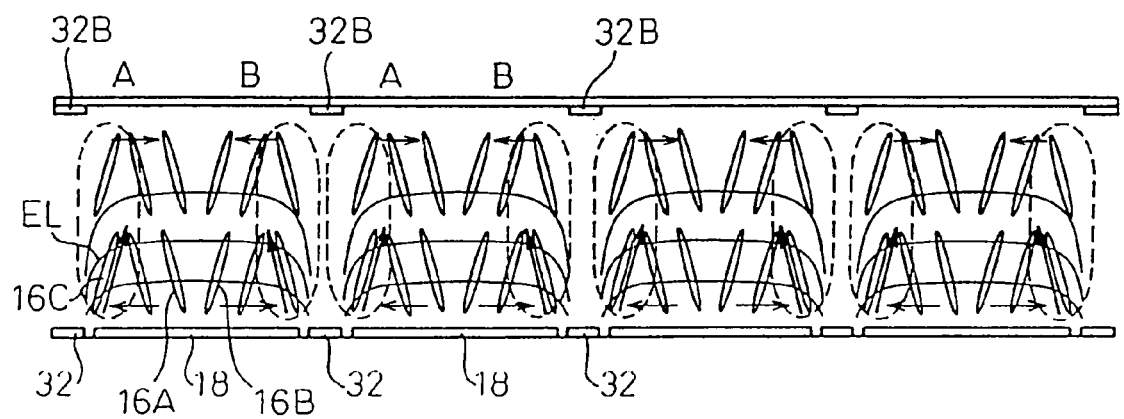
FIG. 18 is a view illustrating an alignment of the liquid crystal molecules in the liquid crystal display apparatus having the substrate to which an alignment treatment is carried out in such a manner as described with reference to FIG. 14.

FIG. 18 is a view illustrating an alignment of the liquid crystal molecules in the liquid crystal display apparatus 10 having the substrate 12 to which an alignment treatment is carried out in such a manner as described with reference to FIG. 14. One of the substrates (TFT substrate) 12 has pixel electrodes 18, data bus lines 32, gate bus lines and the alignment layer 20, and the other substrate (color filter substrate) 14 has the common electrode 22 and the alignment layer 24, as shown in FIG. 1, for example. The other substrate 14 has no such bus lines. However, the other substrate 14 has the black matrix or the like 32B at positions corresponding to the data bus lines 32 and the gate bus lines. Therefore, it is possible to determine the positions corresponding to the data bus lines 32 and the gate bus lines.

In FIG. 14, the ultraviolet light is made incident to the domain A in one pixel in the oblique direction from the left and upper point to the right and lower point, and the ultraviolet light is made incident to the domain B in one pixel in the oblique direction from the right and upper point to the left and lower point. The direction of the irradiation of the ultraviolet light determines the pretilt direction of the liquid crystal molecules in the liquid crystal display apparatus 10 during use. As a result, as shown in FIG. 18, the liquid crystal molecules in the domain A in one pixel tend to pretilt in the direction from the left and upper point to the right and lower point, and the liquid crystal molecules in the domain B in one pixel tend to pretilt in the direction from the right and upper point to the left and lower point. When the voltage is applied, the liquid crystal molecules will tilt down in the direction of the arrow, based on the direction of the pretilt. The alignment treatment of the other substrate 14 is not illustrated, but it will be understood that the alignment treatment of the other substrate 14 is carried out in conformity with the alignment treatment of the substrate 12 so that the liquid crystal molecules in each domain A or B behave in the same way.

When the voltage is applied, electric field is produced between the pixel electrode 18 and the common electrode 22, and also electrical line of force EL is produced between two adjacent data bus lines 32 (and two gate bus lines), as shown in FIG. 18. Electrical line of force EL extends transversely across one pixel, and the liquid crystal molecules 16C positioned near the data bus lines 32 (gate bus lines) are particularly affected by the electrical line of force EL. These liquid crystal molecules 16C tend to tilt down along the electrical line of force EL, and this tilting direction is opposite to that of the liquid crystal molecules 16A belonging to the domain A. Therefore, disclination may be caused in the portions adjacent to the data bus lines 32 (gate bus lines).

Figure 19:
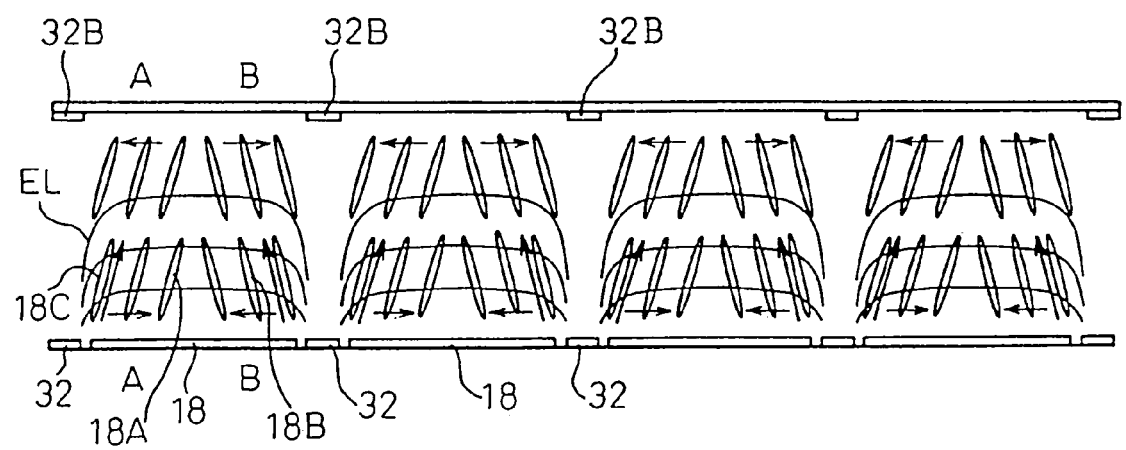
FIG. 19 is a view illustrating an alignment of the liquid crystal molecules in the liquid crystal display apparatus having the substrate to which an improved alignment treatment is carried out according to a further embodiment of the present invention.

FIG. 19 shows an alignment of the liquid crystal molecules in the liquid crystal display apparatus having the substrate to which an improved alignment treatment is carried out. In FIG. 19, the liquid crystal molecules in the domain A in one pixel tend to pretilt in the direction from the right and upper point to the left and lower point, and the liquid crystal molecules in the domain B in one pixel tend to pretilt in the direction from the left and upper point to the right and lower point. When the voltage is applied, the liquid crystal molecules will tilt down in the direction of the arrow, based on the direction of the pretilt. That is, the alignment treatment in FIG. 19 is carried out in the reverse sense with respect to the alignment treatment in FIG. 19, regarding one pixel delimited by the data bus lines 32. Therefore, in FIG. 19, the liquid crystal molecules 16C positioned near the data bus lines 32 (gate bus lines) tend to tilt down along the electrical line of force EL, and this tilting direction is the same as that of the liquid crystal molecules 16A belonging to the domain A. Therefore, no disclination may be caused in the portions adjacent to the data bus lines 32 (gate bus lines).

Figure 20:
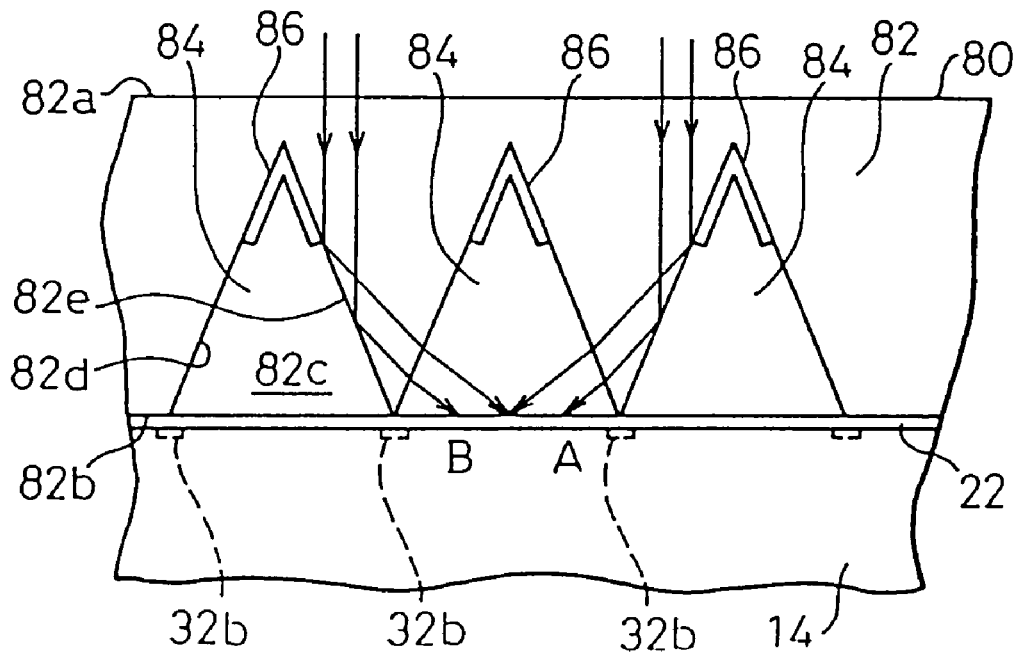
FIG. 20 is a view illustrating a process of an alignment treatment of the color filter substrate to obtain an alignment of the liquid crystal molecules shown in FIG. 19.
Figure 21:
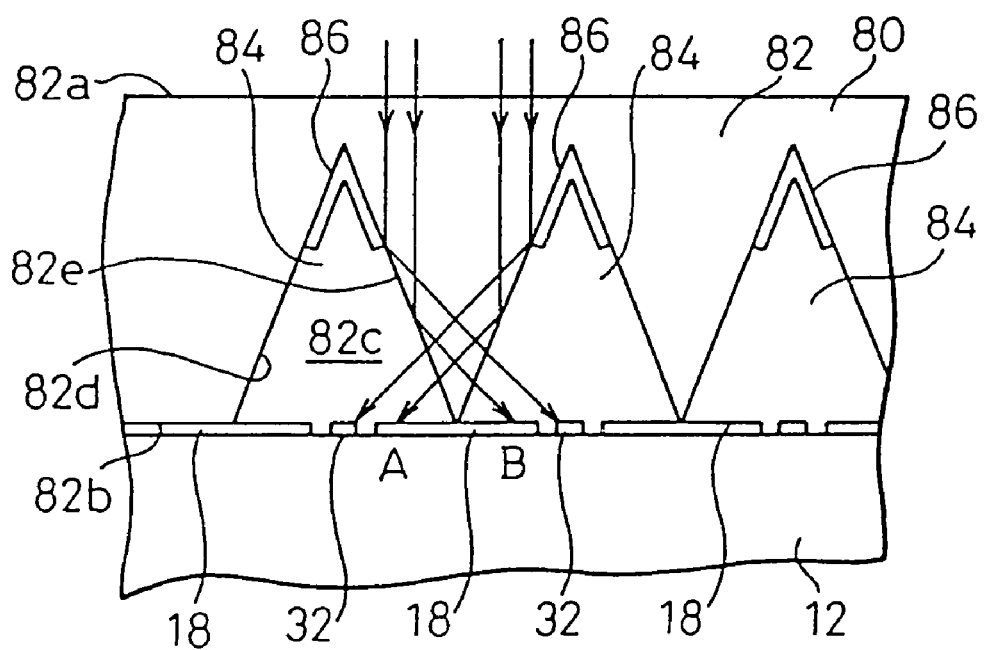
FIG. 21 is a view illustrating a process of an alignment treatment of the TFT substrate to obtain an alignment of the liquid crystal molecules shown in FIG. 19.

FIG. 20 is a view for illustrating a process of an alignment treatment of the color filter substrate 14, which has no bus lines, to obtain an alignment of the liquid crystal molecules shown in FIG. 19. Similarly, FIG. 21 is a view illustrating a process of an alignment treatment of the TFT substrate 12, which has bus lines, to obtain an alignment of the liquid crystal molecules shown in FIG. 19. In this embodiment, the substrates 12 and 14 have the alignment layers 20 and 22 formed thereon, but the alignment layers 20 and 22 are omitted in the figures. As will be apparent, the alignment treatment is effected to the alignment layers 20 and 22 by irradiating the alignment layers 20 and 22 with the ultraviolet light in the oblique directions in the similar way to the above-described embodiments of FIGS. 14 to 17. This embodiment differs from the previous embodiments, in that the positional relationship between the mask 80 and the data bus lines 32 (gate bus lines) or the black matrix or the like 32B.

FIGS. 20 and 21 show an example in which the light path changing portion 84 is shaped in an equilateral triangle. After the alignment layers 20 and 22 are formed on the substrates 12 and 14, a mask 80 comprising a body portion 82 and a plurality of light path changing portions 84. The body portion 82 of the mask 80 has a first flat surface 82a, a second surface 82b on the opposite side from the first surface 82a, and a plurality of cavities 82c provided in the second surface 82b. Each cavity 82c has first and second oblique surfaces 82d and 82e arranged on either side of a vertical plane perpendicular to the first surface 82a (a plane perpendicular to the sheet of FIG. 20 and passing through the apex of the equilateral triangle) to diverge in the direction from the first surface 82a toward the second surface 82b. The light path changing portions 84 are formed by the cavities 82c and a material (air) contained in the cavities 82c.

In FIG. 20, regarding the color filter substrate 14 having no bus lines, the mask 80 is put on the color filter substrate 14 so that an end of the first oblique surface 82d on the second surface 82b (one bottom edge of the equilateral triangle) and an end of the second oblique surface 82e on the second surface 82b (another bottom edge of the equilateral triangle) are located at positions (black matrix or the like 32B) corresponding to the bus lines 32. That is, the apex of the equilateral triangle is at a position corresponding to the center between two adjacent data bus lines 32. Then, the surface of the alignment layer 24 of the color filter substrate 14 is irradiated with the ultraviolet light in the oblique directions, using the mask 80, so that the liquid crystal molecules will be aligned with oblique pretilts.

In FIG. 21, regarding the TFT substrate 12 having bus lines 32, the mask 80 is put on the TFT substrate 12 so that the vertical plane between the first and second oblique surfaces 82d and 82e is located at a position corresponding to the bus line 32. That is, the apex of the equilateral triangle is on the data bus line 32. Then, the surface of the alignment layer 20 of the color filter substrate 14 is irradiated with the ultraviolet light in the oblique directions, using the mask 80, so that the liquid crystal molecules will be aligned with oblique pretilts. One pixel in this case is not correspond to the region of the bottom side of the equilateral triangle, but correspond to the region. delimited by the two adjacent data bus lines.

The alignment of FIG. 19 can be obtained by adhering and joining the color filter substrate 14 of FIG. 20 and the TFT substrate 12 of FIG. 21 and by inserting the liquid crystal between the substrates 12 and 14. The data bus lines 32 and the black matrix or the like 32B exist in the common plane. If color filter substrate 14 does not have black matrix or the like 32B, it is possible to provide and use positioning marks on the color filter substrate 14 such that the positioning marks and the data bus lines 32 exist in the common plane when the substrates are joined. It is not necessary to locate the positioning marks at the same pitch as the those of the data bus lines 32 since the exposure can be carried out by a precise machine such as a stepper.

Figure 22:
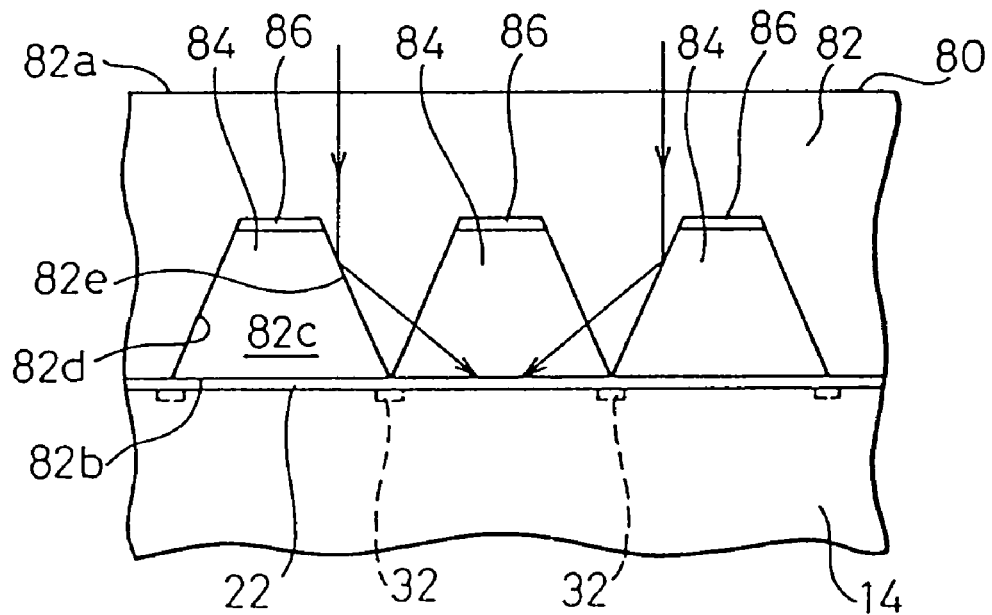
FIG. 22 is a view illustrating a modification of the alignment treatment of FIG. 20.
Figure 23:
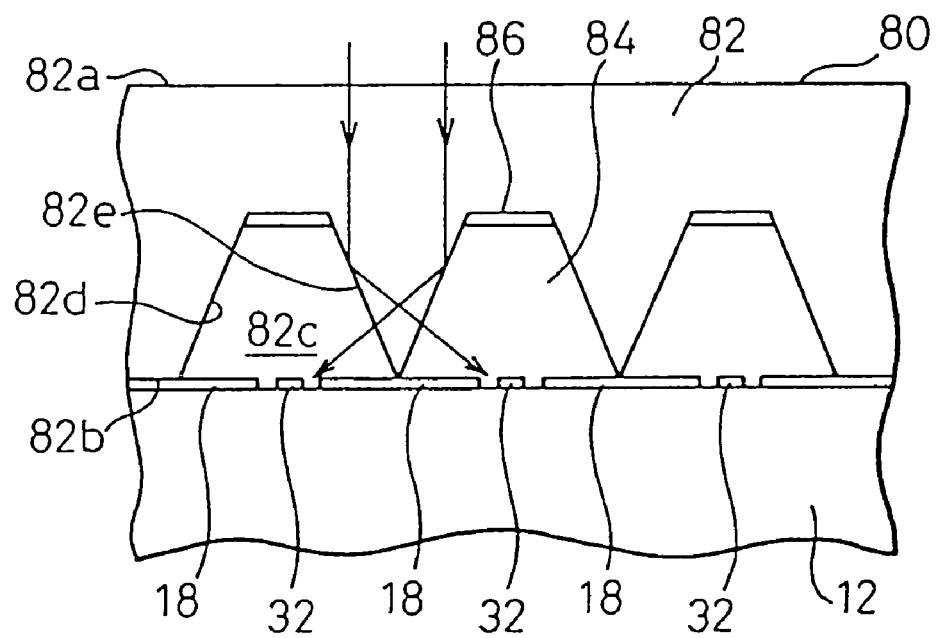
FIG. 23 is a view illustrating a modification of the alignment treatment of FIG. 21.

FIGS. 22 and 23 show an example in which the light path changing portion 84 of the mask 80 is shaped in a trapezoid. The features of the example of FIGS. 22 and 23 are similar to those of FIGS. 20 and 21.

In FIG. 22, regarding the color filter substrate 14 having no bus lines, the mask 80 is put on the color filter substrate 14 so that an end of the first oblique surface 82d on the second surface 82b (one bottom edge of the trapezoid) and an end of the second oblique surface 82e on the second surface 82b (another bottom edge of the trapezoid) are located at the black matrix or the like 32B. That is, the center of the trapezoid is at a position corresponding to the center between two adjacent data bus lines 32. Then, the surface of the alignment layer 24 of the color filter substrate 14 is irradiated with the ultraviolet light in the oblique directions, using the mask 80, so that the liquid crystal molecules will be aligned with oblique pretilts.

In FIG. 23 regarding the TFT substrate 12 having bus lines 32, the mask 80 is put on the TFT substrate 12 so that the vertical plane between the first and second oblique surfaces 82d and 82e is located at a position corresponding to the bus line 32. That is, the center of the trapezoid is on the data bus line 32. Then, the surface of the alignment layer 24 of the color filter substrate 14 is irradiated with the ultraviolet light in the oblique directions, using the mask 80, so that the liquid crystal molecules will be aligned with oblique pretilts.

It has been found that the liquid crystal molecules are aligned in conformity with the alignment treatment of one alignment layer, even if one of the pair of opposed alignment layers is appropriately treated for alignment and the other alignment layer is not treated for alignment.

Therefore, it is preferable to fabricate the liquid crystal display apparatus 10 from the combination of the substrate 14 having the alignment layer treated in according to the alignment treatment process explained with reference to FIG. 20 and the substrate 12 having the alignment layer treated in according to the alignment treatment process explained with reference to FIG. 21. However, it is possible to obtain the liquid crystal display apparatus 10 having the feature illustrated in FIG. 19, from the combination of the substrate 14 having the alignment layer treated in according to the alignment treatment process explained with reference to FIG. 20 and the substrate having the alignment layer which is not treated for alignment, or from the combination of the substrate having the alignment layer which is not treated for alignment and the substrate 12 having the alignment layer treated in according to the alignment treatment process explained with reference to FIG. 21.

Similarly, it is preferable to fabricate the liquid crystal display apparatus 10 from the combination of the substrate 14 having the alignment layer treated in according to the alignment treatment process explained with reference to FIG. 22 and the substrate 12 having the alignment layer treated in according to the alignment treatment process explained with reference to FIG. 23. However, it is possible to obtain the liquid crystal display apparatus 10 having the feature illustrated in FIG. 19, from the combination of the substrate 14 having the alignment layer treated in according to the alignment treatment process explained with reference to FIG. 22 and the substrate having the alignment layer which is not treated for alignment, or from the combination of the substrate having the alignment layer which is not treated for alignment and the substrate 12 having the alignment layer treated in according to the alignment treatment process explained with reference to FIG. 23.

Figure 24:
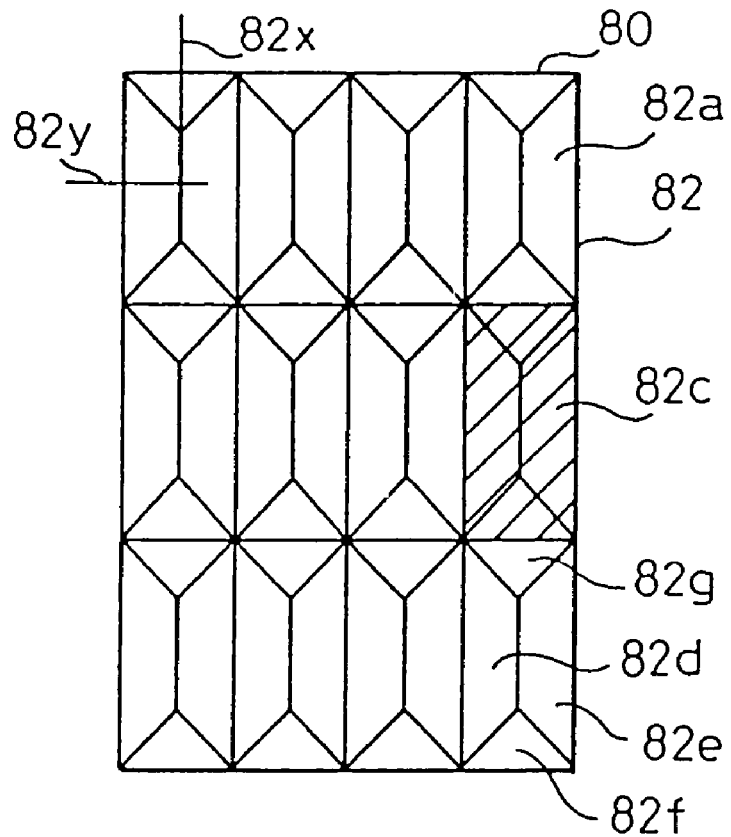
FIG. 24 is a plan view illustrating a mask according to a further embodiment of the present invention for an alignment treatment by which four domains are formed.
Figure 25:
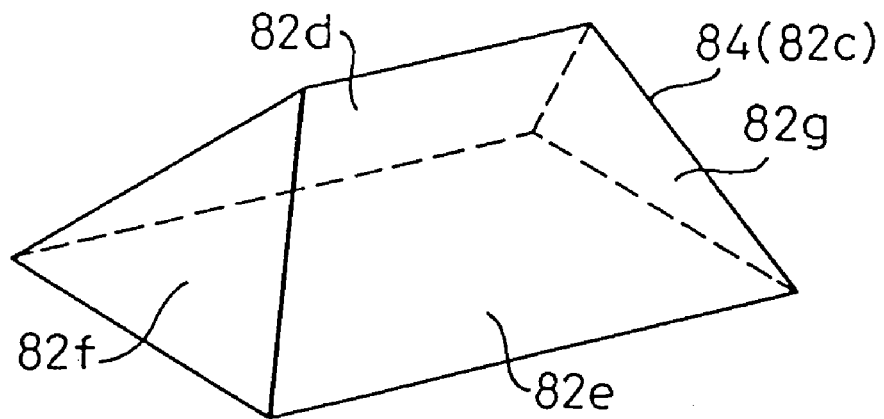
FIG. 25 is a perspective view of the light path changing portion of the mask of FIG. 24.
Figure 26:
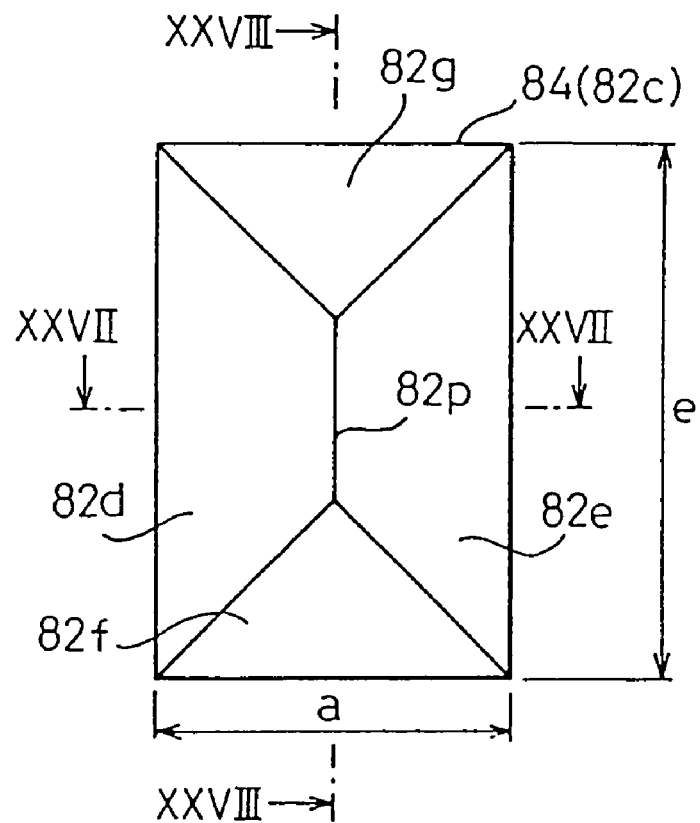
FIG. 26 is a plan view of the light path changing portion of FIG. 25.
Figure 27:
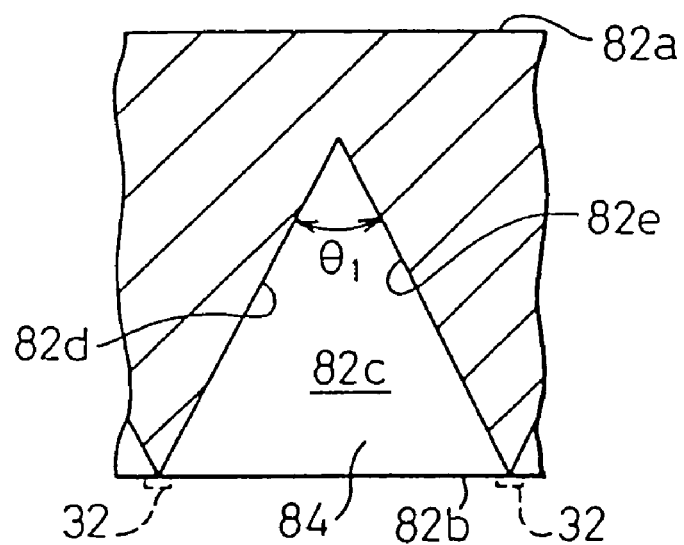
FIG. 27 is a cross-sectional view of the light path changing portion, taken along the line XXVII-XXVII of FIG. 26.
Figure 28:
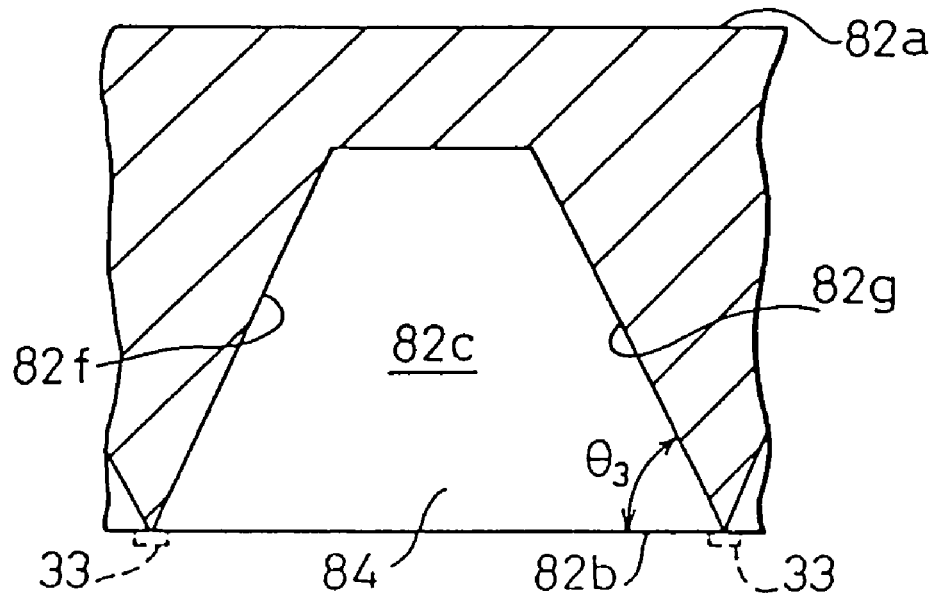
FIG. 28 is a cross-sectional view of the light path changing portion, taken along the line XXVIII-XXVIII of FIG. 26.

FIG. 24 is related to a further embodiment of the present invention and shows a mask 80 for an alignment treatment by which four domains are formed. FIG. 25 is a perspective view of one light path changing portion 84 of the mask 80 of FIG. 24, FIG. 26 is a plan view of the light path changing portion 84, and FIGS. 27 and 28 are cross-sectional views of the light path changing portion 84.

Similar to the embodiments of FIGS. 14 to 23, the mask 80 in this embodiment is used for irradiating the alignment layers 20 and 24 of the substrates 12 and 14 of the liquid crystal display apparatus 10 in the oblique directions. The mask 80 comprises a body portion 82 and a plurality of light path changing portions 84. The light path changing portions 84 are formed in the form of cavities 82c. Each cavity 82c in this embodiment has two pair of oblique surfaces, while each cavity 82c in the previous embodiments has first and second oblique surfaces 82d and 82e arranged to diverge in the direction from the first surface 82a toward the second surface 82b.

That is, first and second vertical planes 82x and 82y are defined perpendicular to the first surface 82a and perpendicular to each other, and each cavity 82c has first and second oblique surfaces 82d and 82e arranged on either side of the first vertical plane 82x to diverge in the direction from the first surface 82a toward the second surface 82b, and third and fourth oblique surfaces 82f and 82g arranged on either side of the second vertical plane 82y to diverge in the direction from the first surface 82a toward the second surface 82b. The light path changing portions 84 are formed by the cavities 82c and a material (air) contained in the cavities 82c. The mask 80 is put on the color filter substrate 14, and the surface of the alignment layer 24 of the color filter substrate 14 with the ultraviolet light in the oblique directions, using the mask 80. In this case, preferably, the alignment layer of the TFT substrate 12 is not treated for alignment.

In the embodiment shown in FIGS. 24 to 28, the first and second oblique surfaces 82d and 82e have a function similar to that of the mask 80 having the saw-toothed shape having an equilateral triangular cross-section of the previous embodiment. The third and fourth oblique surfaces 82f and 82g have a function similar to that of the mask 80 having the saw-toothed shape having a trapezoidal cross-section of the previous embodiment. The ultraviolet light is irradiated onto one pixel in four directions; two differently aligned domains having are formed by the ultraviolet light obliquely irradiated through the first and second oblique surfaces 82d and 82e and two differently aligned domains are formed by the ultraviolet light obliquely irradiated through the third and fourth oblique surfaces 82f and 82g. Therefore, totally four differently aligned domains are formed, with the result that the display can be seen in good condition even if the display is seen any viewing angles.

Figure 29:
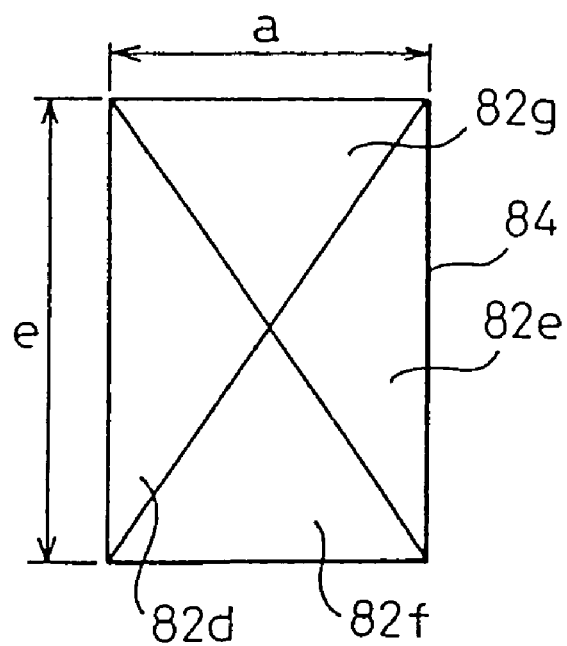
FIG. 29 is a plan view of a modification of the light path changing portion.
Figure 30:
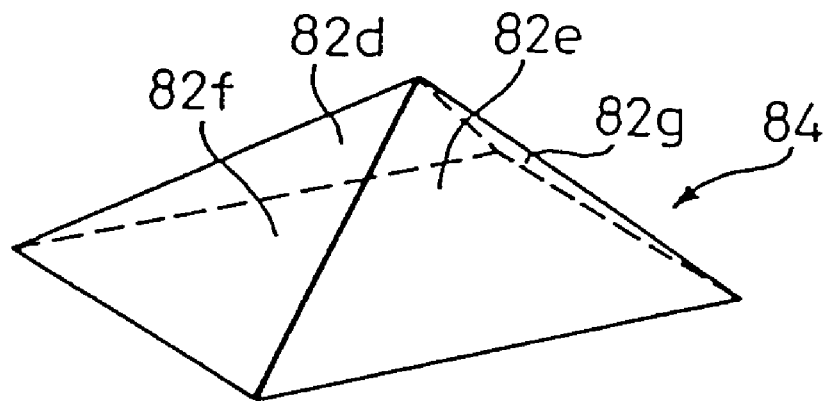
FIG. 30 is a perspective view of the light path changing portion of FIG. 29.

FIGS. 29 and 30 are view illustrating a modification of the light path changing portion 84. The light path changing portion 84 of FIG. 26 has a rectangular base structure having the dimension of a×e (a is the length of the shorter side and e is the length of the longer side, with a peak 82p corresponding to an upper side of a trapezoid. The light path changing portion 84 of FIGS. 29 and 30 has a rectangular base structure corresponding to that of FIG. 26 when the length of the peak 82p is zero. It is also possible to alter the light path changing portion 84 of FIGS. 29 and 30 so that the light path changing portion 84 has a square base structure having the dimension of a×a.

Figure 31:
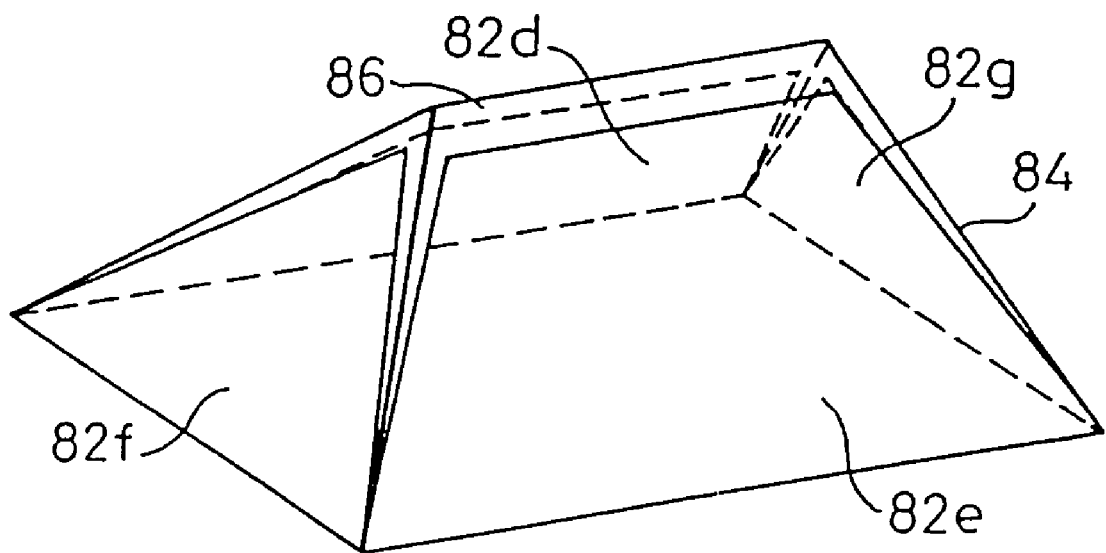
FIG. 31 is a perspective view of an example in which a shielding layer is provided on the light path changing portion of FIGS. 25 and 26.
Figure 32:
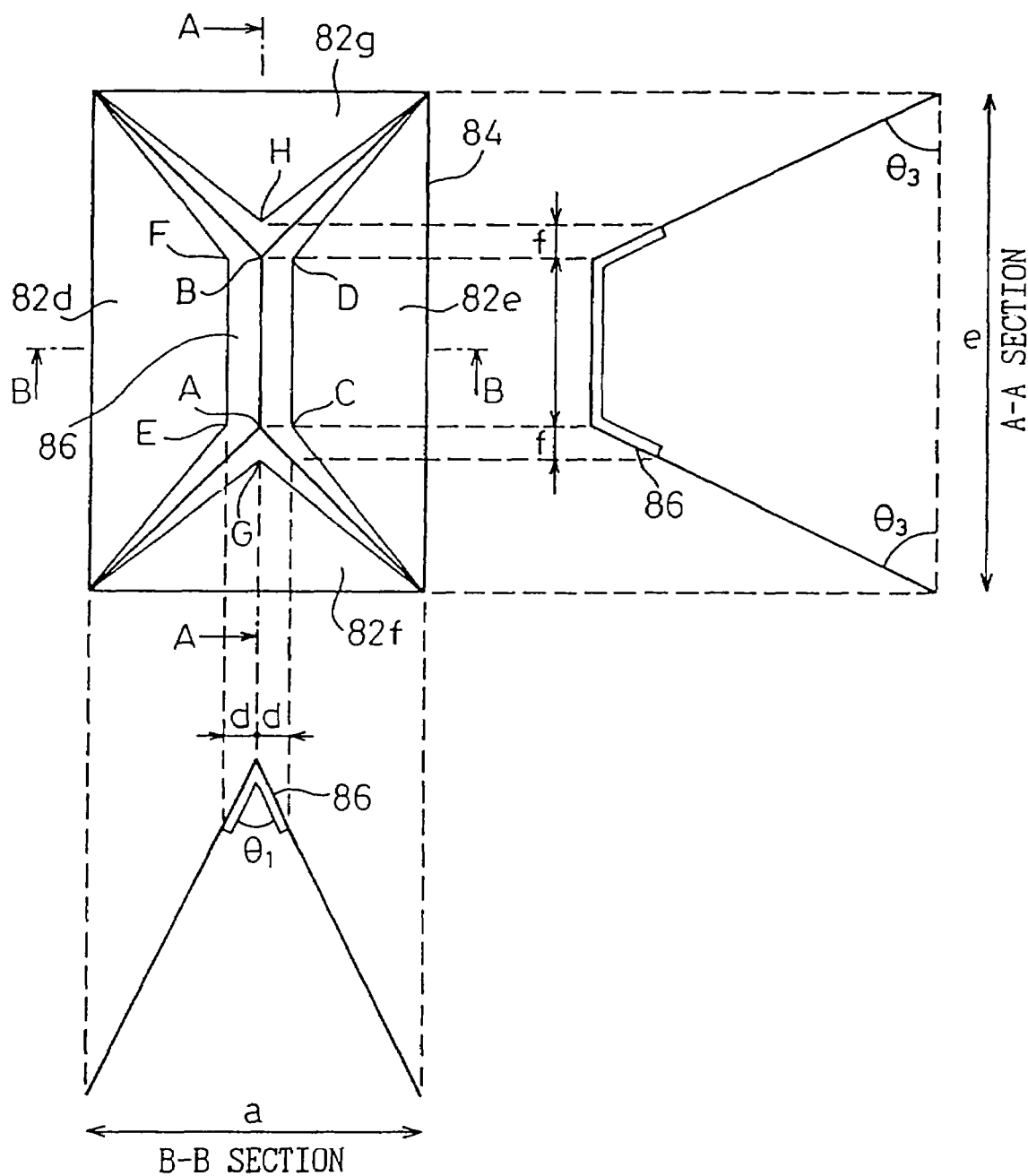
FIG. 32 is a plan view of the light path changing portion of FIG. 31, with schematic cross-sectional views.

FIG. 31 shows an example in which a shielding layer 86 is provided on the light path changing portion 84 of FIGS. 25 and 26. The function of the shielding layer 86 is such that the ultraviolet light irradiated onto a portion of the alignment layer corresponding to one pixel through the first and second oblique surfaces 82d and 82e and through the third and fourth oblique surfaces 82f and 82g can just cover the portion of the alignment layer corresponding to one pixel without any overlap of the light components.

It is preferable to satisfy the following relationship for the shielding layer 86 to establish this function. Opposite ends of the peak 82p corresponding to the upper side of the trapezoid are represented by points A and B. Corners of the portions of the shielding layer 86 extending within the first and second oblique surfaces 82d and 82e parallel to the peak 82p are represented by points C, D, E and F. The C and E are contained in the vertical plane perpendicular to the peak 82p and passing through the point A, and the D and F are contained in the vertical plane perpendicular to the peak 82p and passing through the point B. Corners of the portions of the shielding layer 86 existing within the third and fourth oblique surfaces 82f and 82g and in the vertical plane containing the peak 82p are represented by points G and H. The shielding layer 86 is obtained by drawing lines from the points C, D, E, F, G and H to the corners of the rectangular base portion of the light path changing portion 84.

It is enough to obtain the lengths d and f to determine the points C, D, F, F, G and H. The length d is the length between the peak 82p and each of the points C, D, F, and F when viewed from above. The length f is the length between end of the peak 82p and each of the points G and H when viewed from above. The lengths d and f can be calculated by the following relationships (6) to (9).

$$f = \frac{a}{2} \times \left( \frac{\tan^2 \frac{\theta_3}{4} - \tan \frac{\theta_3}{2} \tan \frac{\theta_3}{4} - 2\tan \frac{\theta_3}{2} \tan\theta_4}{\tan^2 \frac{\theta_3}{4} - \tan \frac{\theta_3}{2} \tan \frac{\theta_3}{4} + \tan \frac{\theta_3}{4} \tan\theta_4 - \tan \frac{\theta_3}{2} \tan\theta_4} \right) \quad (6)$$

$$n_1 \sin 3\theta_3 = n_2 \cos(\theta_3 + \theta_4) \quad (7)$$

$$d = \frac{a}{2} \times \frac{\tan\theta_1 - \tan\frac{\theta_1}{2} + \tan\theta_1 \tan\frac{\theta_1}{2}\tan\theta_2 - \tan^2\frac{\theta_1}{2}\tan\theta_2}{\tan\theta_1 - \tan\frac{\theta_1}{2} - 2\tan^2\frac{\theta_1}{2}\tan\theta_2} \quad (8)$$

$$n_1 \cos\frac{3\theta_1}{2} = n_2 \sin\left(\theta_2 - \frac{\theta_1}{2}\right) \quad (9)$$

Here, n1 is the refractive index of the body portion 82 of the mask 80, n2 is the refractive index of the light path changing portion 84, θ1 is the apex angle of the equilateral triangle in the vertical plane, θ2 is the incident angle of the ultraviolet light irradiated onto the alignment layer, and θ3 is the bottom angle of the trapezoid.

Also, it is important that the following relationships are satisfied.

where $\theta_1 \leq 60°$, $$n_1 \cos\frac{3\theta_1}{2} = n_2 \sin\left(\theta_2 - \frac{\theta_1}{2}\right) \quad (1)$$

where $\theta_1 \geqq 60°$, $$n_1 \cos\frac{3\theta_1}{2} = n_2 \sin\left(\frac{\theta_1}{2} - \theta_2\right) \quad (2)$$

As described above, according to the present invention, the alignment treatment using the irradiation of ultraviolet light can be performed over the entire substrate in the simplest fashion, without causing any alignment fault and requires no conventional rubbing step. Also, each irradiation of the ultraviolet light can form areas (domains) having plurality of alignment directions in a single pixel, thereby reducing the device cost and shortening the fabrication tact.

The invention claimed is:

1. A method of fabricating a liquid crystal display device comprising a pair of opposed and spaced substrates, an alignment layer formed on one of said substrates, an alignment layer formed on the other substrate, a plurality of bus lines provided on one of said substrates, and a liquid crystal inserted between said pair of substrates, said method comprising the steps of:

forming said alignment layer on each of said substrates;

preparing a mask having a body potion and a plurality of light path changing portions arranged in said body portion corresponding to pixel pitches, said body portion of said mask having a first flat surface, a second surface on the opposite side from said first flat surface, and a plurality of cavities provided in said second surface, first and second vertical planes being defined perpendicular to said first flat surface and perpendicular to each other, each cavity having first and second oblique surfaces arranged on either side of the first vertical plane to diverge in the direction from said first surface toward said second surface, and third and fourth oblique surfaces arranged on either side of the second vertical plane to diverge in the direction from said first surface toward said second surface, said light path changing portions being formed by said cavities and a material contained in said cavities;

putting said mask on said substrate; and irradiating the surface of said alignment layer of said substrate with ultraviolet light in the oblique direction, using said mask;

wherein said cavity has a saw-toothed shape having a trapezoidal cross-section.

* * * * *